United States Patent
Sugata et al.

(10) Patent No.: US 10,343,382 B2
(45) Date of Patent: *Jul. 9, 2019

(54) MULTI-LAYER POLYOLEFIN POROUS MEMBRANE, BATTERY SEPARATOR OBTAINED USING THE SAME, AND METHOD FOR PRODUCING THE SAME

(71) Applicant: TORAY INDUSTRIES, INC., Tokyo (JP)

(72) Inventors: Masami Sugata, Tochigi (JP); Koichi Matano, Tochigi (JP); Naoki Mizuno, Tochigi (JP)

(73) Assignee: TORAY INDUSTRIES, INC., Tokyo (JP)

( * ) Notice: Subject to any disclaimer, the term of this patent is extended or adjusted under 35 U.S.C. 154(b) by 107 days.

This patent is subject to a terminal disclaimer.

(21) Appl. No.: 15/309,782

(22) PCT Filed: Apr. 28, 2015

(86) PCT No.: PCT/JP2015/062904
§ 371 (c)(1),
(2) Date: Mar. 3, 2017

(87) PCT Pub. No.: WO2015/170653
PCT Pub. Date: Nov. 12, 2015

(65) Prior Publication Data
US 2017/0282513 A1    Oct. 5, 2017

(30) Foreign Application Priority Data

May 9, 2014 (JP) .................................. 2014-098153
Sep. 9, 2014 (JP) .................................. 2014-183047

(51) Int. Cl.
| | | |
|---|---|---|
| H01M 10/0525 | (2010.01) | |
| H01M 2/16 | (2006.01) | |
| B32B 27/32 | (2006.01) | |
| B29C 47/06 | (2006.01) | |
| B32B 3/30 | (2006.01) | |
| B29C 48/21 | (2019.01) | |
| B29C 48/18 | (2019.01) | |

(52) U.S. Cl.
CPC .............. B32B 27/32 (2013.01); B29C 48/18 (2019.02); B29C 48/21 (2019.02); B32B 3/30 (2013.01); H01M 2/1653 (2013.01); H01M 2/1686 (2013.01); H01M 10/0525 (2013.01)

(58) Field of Classification Search
CPC ...... B32B 27/32; B32B 3/30; H01M 10/0525; H01M 2/1686; H01M 2/1653; B29C 47/065; B29C 47/06
See application file for complete search history.

(56) References Cited

U.S. PATENT DOCUMENTS

| | | | | |
|---|---|---|---|---|
| 2007/0023290 A1* | 2/2007 | Hawkins | ............... | B01D 61/445 |
| | | | | 204/520 |
| 2007/0231887 A1* | 10/2007 | McGrath | ................. | B01L 3/502 |
| | | | | 435/1.1 |
| 2010/0015530 A1* | 1/2010 | Katayama | ................ | H01G 9/02 |
| | | | | 429/246 |
| 2010/0129720 A1* | 5/2010 | Sako | .................... | H01M 2/1653 |
| | | | | 429/246 |
| 2010/0294363 A1* | 11/2010 | Gust | ....................... | B32B 27/08 |
| | | | | 136/259 |
| 2010/0295511 A1* | 11/2010 | Kikuchi | ............. | B01D 67/0027 |
| | | | | 320/128 |
| 2016/0359156 A1* | 12/2016 | Ohkubo | .................. | H01M 4/13 |

FOREIGN PATENT DOCUMENTS

| | | |
|---|---|---|
| JP | 2003-003006 A | 1/2003 |
| JP | 2004-083866 A | 3/2004 |
| JP | 2010-502472 A | 1/2010 |
| JP | 2010-104127 A | 5/2010 |
| JP | 4460028 B | 5/2010 |
| JP | 2010/537845 A | 12/2010 |
| JP | 4789274 B2 | 10/2011 |
| JP | 2012-043762 A | 3/2012 |
| JP | 4931083 B2 | 5/2012 |
| WO | 2007/049568 A1 | 5/2007 |
| WO | 2008/053898 A1 | 5/2008 |
| WO | 2009/28734 A1 | 5/2009 |
| WO | 2013/146585 A1 | 10/2013 |
| WO | 2014/132791 A1 | 9/2014 |
| WO | 2014/175050 A1 | 2/2017 |

OTHER PUBLICATIONS

International Search Report and Written Opinion of PCT/JP2015/062904 dated Jul. 28, 2015, all pages.
International Preliminary Report on Patentability of PCT/JP2015/062904 dated Nov. 15, 2016, all pages.

* cited by examiner

*Primary Examiner* — Muhammad S Siddiquee
(74) *Attorney, Agent, or Firm* — Kilpatrick Townsend & Stockton LLP

(57) ABSTRACT

A multi-layer polyolefin porous membrane is disclosed. The membrane includes first and second layers, and a plurality of protrusions including polyolefin. The protrusions have a protrusion width (W) satisfying 5 μm≤W≤50 μm and have a protrusion height (H) satisfying 0.5 μm≤H. The protrusions are randomly disposed on a first side of the membrane, and the protrusions are disposed with a density of not less than 3 protrusions/cm² and not greater than 200 protrusions/cm². A meltdown temperature of the membrane is not lower than 165° C., an air permeation resistance of the membrane is not greater than 300 sec/100 cc Air, and a thickness of the membrane is not greater than 20 μm.

4 Claims, 2 Drawing Sheets

MULTI-LAYER POLYOLEFIN POROUS MEMBRANE, BATTERY SEPARATOR OBTAINED USING THE SAME, AND METHOD FOR PRODUCING THE SAME

CROSS-REFERENCE TO RELATED APPLICATIONS

This application is a United States National Phase Application of International Patent Application Number PCT/JP2015/062904, filed Nov. 9, 2016 and entitled "MULTI-LAYER POLYOLEFIN POROUS MEMBRANE, BATTERY SEPARATOR OBTAINED USING THE SAME, AND METHOD FOR PRODUCING THE SAME", which Application claims priority to Japanese Patent Application Number 2014-098153, filed with the Japanese Patent Office on May 9, 2014, and to Japanese Patent Application Number 2014-183047, filed with the Japanese Patent Office on Sep. 9, 2014, the contents of which are incorporated herein by reference in their entirety.

TECHNICAL FIELD

The present invention relates to a multi-layer polyolefin porous membrane that is suitable for laminating a modified porous layer and a battery separator. The battery separator is useful as a lithium-ion battery separator.

BACKGROUND ART

Thermoplastic resin microporous membranes are used widely as a material for separation, selective permeation, isolation of substances, and the like. For example, the usage includes battery separators for lithium ion rechargeable batteries, nickel-metal hydride batteries, nickel-cadmium batteries, or polymer batteries, separators for electric double layer capacitors, various filters such as reverse osmosis filtration membrane, ultrafiltration membrane, microfiltration membrane and the like, waterproof moisture-vapor permeable clothes, medical materials and the like. In particular, polyolefin porous membranes are preferably used as separators for lithium ion rechargeable batteries. This is because the membrane exhibits ion permeability due to electrolytic solution impregnation and possesses not only excellent electrical insulating properties, electrolytic solution resistance, and anti-oxidation properties, but also pore blocking effect, which block the electrical current to prevent excessive temperature increase at the temperature range of about from 120 to 150° C. in abnormal temperature increase in batteries. However, if the temperature continues to increase even after the pore blocking for some reason, the decrease in viscosity of the polyolefin that constitutes the membrane and the shrinkage of the membrane may lead to membrane puncture at a certain temperature. This phenomenon is not limited to polyolefin. Even if the other thermoplastic resin is used, this phenomenon cannot be avoided at the temperature equal to or above the melting point of the resin, which constitutes the porous membrane.

Especially, separators for lithium-ion batteries greatly affect battery characteristics, battery productivity and battery safety, and require good mechanical properties, heat resistance, permeability, dimensional stability, pore blocking characteristics (shut down characteristics), membrane melt-puncture characteristics (melt-down characteristics) and the like. Furthermore, they require improved adhesion to an electrode material for improvement in cycle characteristics of batteries and improved wettability toward electrolytic solution for productivity improvement. For this purpose, research has been conducted to laminate various modified porous layers on porous membranes. As modified porous layers, polyamideimide resin, polyimide resin, and polyamide resin, which have both good heat resistance and good wettability toward electrolytic solution, and/or fluorine-based resin, which exhibits good adhesion toward electrodes are preferably used. A modified porous layer described in the present invention refers to a layer that includes resin, which provides or improves at least one of the functions among heat resistance, adhesion to an electrode material, wettability toward electrolytic solution and the like.

Furthermore, it is necessary to increase the area not only of an electrode but also of a separator to fill a container in order to increase battery capacity. Therefore the decrease in thickness of the separator is expected. However, since the thinner porous membrane may experience deformation in its planar directions, a modified porous layer laminated on a thin porous membrane in a battery separator may delaminate during processing, the slit process, or the battery assembly process and the safety may be compromised.

In addition, significant reduction in battery assembly process time is expected to facilitate cost reduction. Therefore an improvement in adhesion, which can withstand such a high-speed process with few problems such as delamination of modified porous layers, is required. However, when the resin included in the modified porous layer is sufficiently permeated into the polyolefin porous membrane, which is a substrate, in order to improve the adhesion, large increases in air permeation resistance have been problematic.

In addition from the viewpoint of shut-down characteristics, methods in which a low-melting point ingredient is added to a polyolefin microporous membrane have been disclosed. However, on the other hand, when a resin with a low melting point is added, pores are blocked at the time of the production of a microporous membrane or at the time of the production of a battery, so there has been a problem in that the range of increase in air permeation resistance increases further when forming a modified porous layer.

In Patent Document 1, polyvinylidene fluoride is coated on a 9 μm thick polyolefin porous membrane, and a fraction of polyvinylidene fluoride resin penetrates into fine pores of the polyolefin porous membrane to exhibit anchor effect. The resultant composite porous membrane with a peel strength (T-peel strength) of 1.0 to 5.3 N/25 mm at the interface between the polyolefin porous membrane and the polyvinylidene fluoride coating is disclosed.

In Patent Document 2, a heat-resistant porous layer, which contains acrylic resin and a N-vinyl acetamide polymer or thickener of water soluble cellulose derivative and plate-like boehmite, is disposed on a 16 μm thick, corona-discharge treated polyolefin porous membrane. The resultant separator with a 180° peel strength (T-peel strength) of 1.1 to 3.0 N/10 mm at the interface between the polyolefin porous membrane and the heat-resistant porous layer is disclosed.

In Patent Document 3, the method of producing a porous membrane is disclosed, in which polyolefin solution that comprises 30 parts by weight of polyolefin composition (20 wt. % of ultrahigh molecular weight polyethylene (UHMWPE) with a weight average molecular weight of $2.0 \times 10^6$, 80 wt. % of high-density polyethylene (HDPE) with a weight average molecular weight of $3.5 \times 10^5$, and antioxidant) and 70 parts by weight of liquid paraffin are extruded from an extruder at 190° C., and the extrudate is wound by a cooling roll kept at 50° C. The resultant gel-like product is stretched biaxially to the magnification of 5×5, and the porous membrane is obtained.

In Patent Document 4, the method of producing a microporous membrane is disclosed, in which polyolefin solution similar to that in Patent Document 3 is extruded from an extruder, and the extrudate is wound by a cooling roll kept at 0° C. The resultant gel-like product is stretched biaxially to the magnification of 5×5, and the microporous membrane is obtained.

In Example 1 of Patent Document 5, a polyolefin solution that comprises 50 parts by mass of composition (47.5 parts by mass of polyethylene with a viscosity-average molecular weight of 200,000, 2.5 parts by mass of polypropylene with a viscosity-average molecular weight of 400,000 and antioxidant) and 50 parts by mass of liquid paraffin is extruded from an extruder at 200° C. and the extrudate is wound by a cooling roll kept at 25° C. The resultant gel-like product is stretched biaxially to the magnification of 7×6.4, and a polyolefin resin porous membrane is obtained. A multi-layer porous membrane obtained by laminating a coating layer that comprises polyvinylalcohol and alumina particles on the surface of the polyolefin resin porous membrane is disclosed.

In Example 6 of Patent Document 6, a polyethylene solution that comprises 30 wt. % of polyethylene composition (including polyethylene with weight average molecular weight of 4,150,000, and polyethylene with weight average molecular weight of 560,000 at weight ratio of 1:9, respectively) and 70 wt. % of solvent mix of liquid paraffin and decalin is extruded from an extruder at 148° C. and the extrudate is cooled in a water bath. The resultant gel-like product is stretched biaxially to the magnification of 5.5× 11.0, and a polyolefin porous membrane is obtained. A separator for a non-aqueous rechargeable battery obtained by laminating a coating layer that comprises meta-type wholly aromatic polyamide and alumina particles on the surface of the polyolefin porous membrane is disclosed.

In Patent Document 7, a polyolefin microporous membrane with an embossed pattern of diagonal lattices obtained by passing a gel sheet before stretching between an embossing roll and a back-up roll is disclosed.

In Patent Document 8, a polyolefin microporous membrane formed by laminating a surface layer comprising 38.8 wt. % of a high-density polyethylene (HDPE) having a weight average molecular weight of 300,000 and 1.2 wt. % of a polypropylene (PP) having a melt index (MI) of 1.0 g/10 min and an inner layer comprising 45 wt. % of HDPE and 55 wt. % of liquid paraffin is disclosed.

In Patent Document 9, a separator for a non-aqueous electrolytic solution battery having a heat resistance at high temperatures which is enhanced by laminating an inorganic filler-containing layer on a polyolefin microporous membrane containing a small amount of a polypropylene is disclosed.

These conventional arts, however, will not sufficiently ensure safety due to partial delamination of the modified porous layers during slit process or battery assembly process, to meet requirements in speed up in the manufacturing processes and reduction in a thickness of a separator, as anticipated by the lower cost and higher capacity in the near future. Especially when the polyolefin resin porous membrane, which is a substrate, becomes thinner, it becomes more difficult to ensure safety sufficiently since it is more difficult to achieve enough anchoring of modified porous layers to the polyolefin resin porous membrane.

CITATION LIST

Patent Literature

Patent Document 1: Japanese Unexamined Patent Application Publication No. 2012-043762A Patent Document 2: Re-publication of PCT International Publication No. 2010-104127A Patent Document 3: Japanese Unexamined Patent Application Publication No. 2003-003006A Patent Document 4: Japanese Unexamined Patent Application Publication No. 2004-083866A Patent Document 5: Japanese Patent No. 4931083B Patent Document 6: Japanese Patent No. 4460028B Patent Document 7: WO/2008/053898

Patent Document 8: Japanese Unexamined Patent Application Publication No. 2011-63025

Patent Document 9: Japanese Patent No. 4789274B

SUMMARY OF INVENTION

Technical Problem

Considering that battery separators will require further reduction in thickness and lower costs in the future, the present inventors aimed to provide a multi-layer polyolefin porous membrane with exceptionally high peel strength to a modified porous layer, suitable for high-speed processing during slit process and battery assembly process, and suitable for laminating on a modified porous layer, and a battery separator obtained by laminating a modified porous on a polyolefin porous membrane with exceptionally high peel strength to a modified porous layer, and suitable for high-speed processing during slit process and battery assembly process.

Peel strength between a multi-layer polyolefin porous membrane and a modified porous layer in a separator, referred in the present disclosure, is a value obtained from the measurement described below (in some cases, it is also referred to as 0° peel strength).

FIG. 1 is a schematic side view of a multi-layer sample of a polyolefin porous membrane and a modified porous layer under tension provided by a tensile tester (not illustrated). Reference sign 1 denotes a multi-layer sample, 2 denotes a multi-layer polyolefin porous membrane, 3 denotes a modified porous layer, 4 denotes a double-sided adhesive tape, 5 and 5' denote aluminum plates, and the arrow in the figure indicates the direction of tensile force. On the aluminum plate 5, which is 50 mm×25 mm in size and 0.5 mm in thickness, the double-sided adhesive tape 4 of the same size is adhered. The surface of the multi-layer polyolefin porous membrane 2 side of the sample 1 (the battery separator), cut out in the size of 50 mm in width and 100 mm in length, is adhered on the aluminum plate 5, so that the 40 mm portion of the sample, measured from one of the 25 mm long edges of the aluminum plate 5, is overlapped and adhered together, while the protruded portion is cut out. Next, a double-sided adhesive tape is adhered on one side of the aluminum plate 5', which is 100 mm in length, 15 mm in width and 0.5 mm in thickness. And the 20 mm portion of the sample, measured from one of the 25 mm long edges of the aluminum plate 5, is overlapped and adhered together. Then, using the tensile tester, the load is applied on the aluminum plate 5 and the aluminum plate 5' in parallel but in opposite directions, at a strain rate of 10 mm/min, and the strength at which the modified porous layer is delaminated is measured. When the peel strength measured by this evaluation method is not less than 100 N/15 mm, then there will be few incidents of delamination of the multi-layer modified porous layer during the transportation and the process, even if the thickness of the polyolefin porous membrane is not greater than 10 μm, for example.

T-peel strength or 180° peel strength, both of which are conventionally used for peel strength measurement, is the peel force required to peel off the coating layer from the polyolefin porous membrane in the perpendicular direction or in the direction diagonally backward from the perpendicular direction, to the polyolefin porous membrane surface. Compared to these conventional evaluation methods, this evaluation method may provide the better evaluation in relation to the actual scratch resistance during the slit process and the battery assembly process.

Solution to Problem

In order to solve the problems described above, a battery separator of the present invention comprises a configuration below.

(1) A multi-layer polyolefin porous membrane comprising at least two layers; protrusions made of polyolefin satisfying $5 \ \mu m \leq W \leq 50 \ \mu m$ (where W is a protrusion size) and $0.5 \ \mu m \leq H$ (where H is a protrusion height) and being randomly disposed on one side of the multi-layer polyolefin porous membrane at a density of not less than 3 protrusions/cm$^2$ and not greater than 200 protrusions/cm$^2$; a meltdown temperature being not lower than 165° C.; an air permeation resistance being not greater than 300 sec/100 cc Air; and a membrane thickness being not greater than 20 μm.

(2) The multi-layer polyolefin porous membrane according to (1), wherein at least one layer contains a polypropylene having an amount of heat of fusion of not less than 90 J/g.

(3) A battery separator comprising a modified porous layer laminated on at least a side having protrusions of the multi-layer polyolefin porous membrane described in (1) or (2).

(4) A production method for the multi-layer polyolefin porous membrane described in (1) or (2) or the battery separator described in (3) comprising the steps of:

(a) preparing a polyolefin resin solution by mixing a forming solvent to polyolefin resin for configuring a layer A, followed by melting and kneading the mixture;

(b) preparing a polyolefin resin solution by mixing a forming solvent to polyolefin resin for configuring a layer B, followed by melting and kneading the mixture;

(c) extruding the polyolefin solutions A and B obtained in the steps (a) and (b), respectively, through a die, chilling one or both of the polyolefin solutions by a cooling roll having a surface, the forming solvent thereon being removed by a unit to remove the forming solvent, and forming a multi-layer gel-like product;

(d) stretching the gel-like product in MD (the machine direction) and in TD (the transverse direction) to obtain a stretched and molded material;

(e) extracting and removing the forming solvent from the stretched and molded material followed by drying, to obtain a multi-layer porous molded material; and (f) treating the multi-layer porous molded material by heat to obtain a multi-layer polyolefin porous membrane.

(5) A production method for the multi-layer polyolefin porous membrane or battery separator according to (4), wherein the unit for removing the forming solvent in step (c) is a doctor blade.

Advantageous Effects of Invention

According to the present invention, a multi-layer polyolefin porous membrane with exceptionally good adhesion between modified porous layers, and a battery separator with a modified porous layer, which does not delaminate even during high-speed transport, laminated on the multi-layer polyolefin porous membrane, can be obtained.

DESCRIPTION OF EMBODIMENTS

Figure 1:
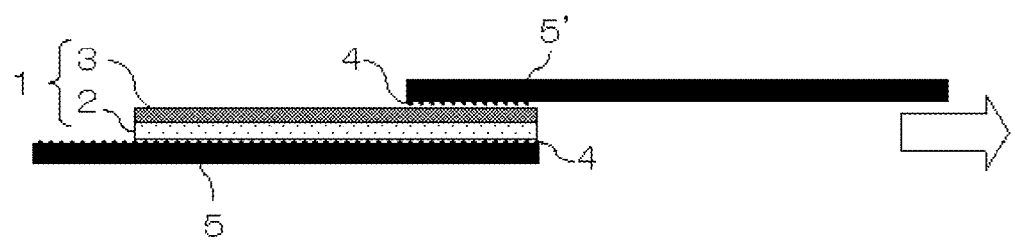
FIG. 1 is a schematic view of the measurement method for 0° peel strength.

In one of preferred embodiments of the present invention, a multi-layer polyolefin porous membrane with appropriate shape and protrusions on the surface is provided, which can be obtained by using a specific polyolefin resin solution, and by specifically controlling the cooling rate of the polyolefin resin solution extruded through a die from an extruder during the steps of manufacturing the multi-layer polyolefin porous membrane. Furthermore, a multi-layer polyolefin porous membrane is provided, which, upon laminating a modified porous layer on the multi-layer polyolefin porous membrane, has an excellent peel strength to the modified porous layer, and exhibits small increase in air permeation resistance.

Protrusions described in the present invention are fundamentally different from those obtained by adding inorganic particles to a multi-layer polyolefin porous membrane, for example. The protrusions obtained by adding inorganic particles to a multi-layer polyolefin porous membrane are usually very low in their height, and forming the protrusions with height not less than 0.5 μm would require particles with diameters equal to or larger than the thickness of the multi-layer polyolefin porous membrane. However, addition of such particles would decrease the strength of the multi-layer polyolefin porous membrane and is unrealistic.

The protrusions described in an embodiment of the present invention are obtained by growing the parts of the multi-layer polyolefin porous membrane surface to appropriate shapes, and do not degrade the basic properties of the multi-layer polyolefin porous membrane.

Meanwhile, the randomly disposed protrusions described in an embodiment of the present invention are clearly different from the patterned or periodic arrangement of protrusions obtained by the process of an embossment roll before or after the stretching process during the manufacturing of the multi-layer polyolefin porous membrane. In principle, press working such as embossing forms protrusions by compressing the parts other than the protrusions, is not preferable due to possible decrease in air permeation resistance and in electrolyte permeability.

The protrusions with appropriate size described in an embodiment of the present invention are not less than 5 μm and not greater than 50 μm in size, and are not less than 0.5 μm in height. Namely, $5 \ \mu m \leq W \leq 50 \ \mu m$, where W is protrusion size and $0.5 \ \mu m \leq H$, where H is protrusion height. Such protrusions can function as anchors upon laminating the modified porous layer on the porous membrane, and a battery separator with a large 0° peel strength described above can be obtained as a result. Meanwhile, the upper limit of the protrusion height is not particularly limited, but the height of 3.0 μm may be sufficient. Greater population of protrusions with sufficient height is likely to increase the 0° peel strength described above. Namely, 0° peel strength is influenced by the number and the average height of protrusions with height not less than 0.5 μm. The lower limit of the number of the protrusions (per one side) is 3/cm², preferably 5/cm², and more preferably 10/cm². The upper limit of the number of the protrusions is 200/cm², and preferably 150/cm². The lower limit of the height of the protrusions is 0.5 μm, preferably 0.8 μm, and more preferably 1.0 μm.

Size and height of the protrusions in the present invention are values measured by the measurement method described below.

The increase in air permeation resistance described in the present invention is the difference between air permeation resistance of a multi-layer polyolefin porous membrane that is a substrate and air permeation resistance of a battery separator laminated with a modified porous layer. The increase in air permeation resistance is preferably not greater than 100 sec/100 cc Air.

The overview of the multi-layer polyolefin porous membrane and the battery separator of the present invention is described, but the scope of the invention is not naturally limited to these representative examples.

First, the multi-layer polyolefin porous membrane of the present invention is described. The multi-layer polyolefin porous membrane of the present invention is a multi-layer porous membrane comprising at least two or more layers.

The thickness (total thickness) of the multi-layer polyolefin porous membrane of the present invention is not greater than 20 μm. The upper limit of the multi-layer polyolefin porous membrane thickness (total thickness) is preferably 16 μm and more preferably 12 μm. The lower limit of the multi-layer polyolefin porous membrane thickness (total thickness) is 5 μm and preferably 9 μm. If the thickness of the multi-layer polyolefin porous membrane is in the preferable ranges described above, practical membrane strength and pore blocking function can be achieved, the area in the unit volume of the battery case is not restricted and it is suitable for increase in battery capacity expected in the future.

The meltdown temperature of the multi-layer polyolefin microporous membrane of the present invention is not lower than 165° C. and more preferably not lower than 170° C. If the meltdown temperature is within the range described above, the dimensional stability is excellent even at high temperatures, so the battery stability is superior.

The upper limit of the air permeation resistance of the multi-layer polyolefin porous membrane is 300 sec/100 cc Air, preferably 200 sec/100 cc Air, and more preferably 150 sec/100 cc Air. The lower limit of the air permeation resistance of the multi-layer polyolefin porous membrane is 50 sec/100 cc Air, preferably 70 sec/100 cc Air, and more preferably 100 sec/100 cc Air.

For the porosity of the multi-layer polyolefin porous membrane, the upper limit is preferably 70%, more preferably 60% and even more preferably 55%. For the porosity of the multi-layer polyolefin porous membrane, the lower limit is preferably 30%, more preferably 35% and even more preferably 40%. When air permeation resistance and porosity are in the preferable ranges described above, sufficient battery charge/discharge characteristics, especially sufficient ion permeability (charge/discharge operating voltage) and life of a battery (closely related to the amount of an electrolytic solution to be retained) are achieved, functions as a battery may be sufficiently exhibited and sufficient mechanical strength and insulation may reduce the possibility of shorting during charge/discharge.

The average pore size in the multi-layer polyolefin porous membrane affects pore blocking characteristics greatly, and it is preferably from 0.01 to 1.0 μm, more preferably from 0.05 to 0.5 μm, and even more preferably from 0.1 to 0.3 μm. If the average pore size in the multi-layer polyolefin porous membrane is in the preferable ranges described above, the sufficient 0° peel strength of the modified porous layer described above can be achieved due to the anchor effect of the functionalized resin, the air permeation resistance may not be significantly deteriorated upon laminating the modified porous layer, the response of the pore blocking phenomenon to the temperature may not slow down and pore blocking temperature associated with the rate of temperature increase may not shift to higher temperature.

For the polyolefin resin that constitutes the multi-layer polyolefin porous membrane, polyethylene, polypropylene, and the like are preferable. The polyolefin resin used in the present invention will be described in detail hereinafter.

[1] Polyolefin Resin Composition for First Layer (Layer A)

A polyolefin microporous membrane which constitutes layer A of the present invention is polyolefin resin which comprises polyethylene as a major ingredient. In order to improve permeability and pin puncture strength, the content of polyethylene is preferably not less than 80 mass %, and more preferably not less than 90 mass %, based on 100 mass % of total amount of polyolefin resin, and even more preferably polyethylene is used alone.

The polyethylene include high-density polyethylene, the density of which is greater than 0.94 g/cm³, moderate density polyethylene, the density of which is in a range of 0.93 to 0.94 g/cm³, low-density polyethylene, the density of which is less than 0.93 g/cm³, liner low-density poly polyethylene, and the like. From the viewpoint of strength, the polyolefin resin composition preferably includes high-density polyethylene and ultrahigh molecular weight polyethylene. The ultrahigh molecular weight polyethylene may not only be a homopolymer of ethylene, but may also be a copolymer that contains a small amount of other α-olefins. Examples of the α-olefins include propylene, 1-butene, 1-hexene, 1-pentene, 4-methyl-1-pentene, octene, vinyl acetate, methyl methacrylate, styrene and the like. For a multi-layer film, especially those manufactured by co-extrusion method, sometimes it may be difficult to control uniformity of physical properties in transverse direction due to viscosity differences among layers and the like. The use of ultrahigh molecular weight polyethylene in the layer A can prevent inhomogeneous deformation because of greater degree of molecular network in the whole membrane, and can result in a microporous membrane with homogeneous physical properties.

Furthermore, if the content of high molecular weight polyethylene is within the preferable range, protrusions with sufficient height can be obtained. These protrusions function as anchors upon laminating a modified porous layer, resulting in exceptionally high peel resistance against a force applied parallel to the planar directions of the polyethylene porous membrane. Also, when the content of the ultrahigh molecular weight polyethylene is within a preferable range, sufficient tensile strength can be obtained, even if the polyethylene porous membrane thickness is reduced. Preferably, tensile strength is not less than 100 MPa. The upper limit of the tensile strength is not particularly defined.

Here, the weight average molecular weight (Mw hereinafter) of the high-density polyethylene is preferably not less than $1 \times 10^5$ and more preferably not less than $2 \times 10^5$. The upper limit of the weight average molecular weight of the high-density polyethylene is preferably $8 \times 10^5$ and more preferably $7 \times 10^5$. When the Mw of the high-density polyethylene is within the ranges described above, it is possible to achieve both stability of the membrane formation and pin puncture strength obtained as a result. In addition, the Mw of the ultrahigh molecular weight polyethylene is preferably not less than $1 \times 10^6$ and less than $4 \times 10^6$. The use of ultrahigh molecular weight polyethylene with a Mw of not less than $1 \times 10^6$ and less than $4 \times 10^6$ can produce finer pores and fibrils and increase the pin puncture strength. If the Mw of the ultrahigh molecular weight polyethylene is not less than $4 \times 10^6$, it may cause troubles during membrane formation process, such as difficulty in extruding resin from a die due to excessively high viscosity of the melt composition. The lower limit of the ultrahigh molecular weight polyethylene content is preferably 5 mass % and more preferably 18 mass %, based on 100 mass % of total of the polyolefin resin. The upper limit of the ultrahigh molecular weight polyethylene content is preferably 45 mass % and more preferably 40 mass %, based on 100 mass % of total of the polyolefin resin. When the content of the ultrahigh molecular weight polyethylene is within this range, it becomes easy to achieve both pin puncture strength and air permeation resistance.

[2] Polyolefin Resin Composition for Second Layer (Layer B)

A polyolefin microporous membrane which constitutes layer B of the present invention is a polyolefin resin which comprises polyethylene as a main ingredient. From the viewpoint of mechanical strength, a kind of polyethylene is preferably high-density polyethylene used as a major component. In addition, the weight average molecular weight (Mw hereinafter) of the high-density polyethylene is preferably not less than $1 \times 10^5$ and more preferably not less than $2 \times 10^5$. The upper limit of the Mw of the high-density polyethylene is preferably $8 \times 10^5$ and more preferably $7 \times 10^5$. When the Mw of the high-density polyethylene is within the ranges described above, it is possible to achieve both stability of the membrane formation and pin puncture strength obtained as a result.

In addition, in the present invention, it is important for layer B to contain a polypropylene. The addition of polypropylene to layer B can improve the meltdown temperature when the polyolefin microporous membrane of the present invention is used as a battery separator. Polypropylenes that can be used include block copolymers and random copolymers in addition to homopolymers. The block copolymer and the random copolymer can include copolymer ingredients with other $\alpha$-olefins besides propylene. For such $\alpha$-olefin, ethylene is preferable.

The Mw of the polypropylene is preferably not less than $5 \times 10^5$, more preferably not less than $6.5 \times 10^5$, and even more preferably not less than $8 \times 10^5$. If the Mw of the polypropylene is within the range described above, it is possible to obtain a membrane with a uniform membrane thickness without degrading the dispersibility of the polypropylene at the time of sheet formation. In addition, the heat of fusion ($\Delta H_m$) of the polypropylene is preferably not less than 90 J/g and more preferably 95 J/g. If the $\Delta H_m$ of the polypropylene is within the range described above, it is possible to achieve good meltdown characteristics.

The polypropylene content is preferably less than 60 mass % of the entire mass of the polyolefin composition. If the polypropylene content is not less than 60 mass %, there is a risk that the permeability may be degraded. In addition, when the surface layer is used as layer B and the polypropylene content is not less than 60 mass %, in particular, the amount of powder generated by the fallout of polypropylene during slitting of the multi-layer microporous membrane may increase. If the amount of powder generated by the fallout of polypropylene is large, there is a risk that defects such as pinholes may be generated in the multi-layer microporous membrane product. The lower limit of the added amount of polypropylene is preferably not less than 3 mass %, more preferably not less than 10 mass %, and even more preferably not less than 20 mass %. If the polypropylene content is equal to or greater than the level described above, it is possible to achieve good meltdown characteristics. In addition, if the added amount of polypropylene is within the range described above, protrusions of sufficient height are obtained even when an ultrahigh molecular weight polyethylene is not added.

Layer B preferably also contains ultrahigh molecular weight polyethylene from the perspective of strength. Examples of ultrahigh molecular weight polyethylenes include the ultrahigh molecular weight polyethylenes listed as examples of layer A. Further, a larger number of protrusions can be formed as a result of layer B containing an ultrahigh molecular weight polyethylene.

For both the layer A and the layer B, the polyolefin microporous membrane of the present invention may include various additives such as an antioxidant, a heat stabilizer, an anti-static agent, and an ultra-violet absorbent, even a blocking retardant, filler, or nucleating agent, as long as these additives do not degrade the effect of the present invention. In particular, in order to prevent oxidation degradation of the polyolefin resin due to thermal history, it is preferable to add an antioxidant. The appropriate selection of the types and amounts of an antioxidant and a heat stabilizer is important for the adjustment or enhancement of the characteristics of the fine porous membrane.

It is preferable that the polyolefin microporous membrane of the present invention contains substantially no inorganic particle. The expression "contains substantially no inorganic particle" means that the content of inorganic elements determined by X-ray fluorescence spectroscopy, for example, is not greater than 50 ppm, preferably not greater than 10 ppm, and most preferably not greater than the detection limit. This is because contamination originating from foreign substances, raw materials, or desquamation of dirt deposited on the processing line or apparatus in the polyolefin fine porous membrane manufacturing processes may be present in the membranes, even if the particles are not included in the polyolefin fine membrane intentionally.

The molecular weight distribution (Mw/Mn) of the polyolefin resin of layer B as well as that of layer A, which is the ratio of the weight average molecular weight (Mw) to the number-average molecular weight (Mn), is preferably in the range of from 5 to 200, and more preferably in the range of from 10 to 100. The value of Mw/Mn within the preferable range described above facilitates extrusion of polyolefin solution and provides sufficient numbers of protrusions. Furthermore, it provides sufficient mechanical strength upon decreasing polyolefin porous membrane thickness. The value of Mw/Mn is used as a measure of molecular weight distribution. That is, in the case of a polyolefin comprising a single component, a greater value of Mw/Mn indicates a larger range of molecular weight distribution. The value of Mw/Mn of polyolefin formed of a single component can be adjusted as appropriate by multi-step polymerization of polyolefin. Meanwhile, the value of Mw/Mn of a polyolefin mixture can be adjusted as appropriate by adjusting molecular weight or mixing ratio of each component.

Figure 2:
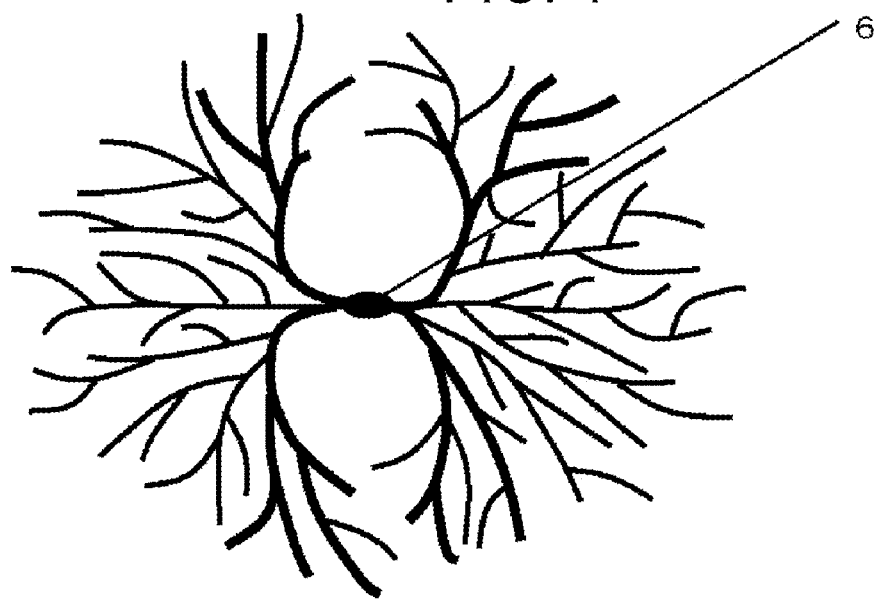
FIG. 2 is a schematic view illustrating a spherulite structure and a spherulite nucleus of polyolefin in the polyolefin porous membrane.
Figure 3:
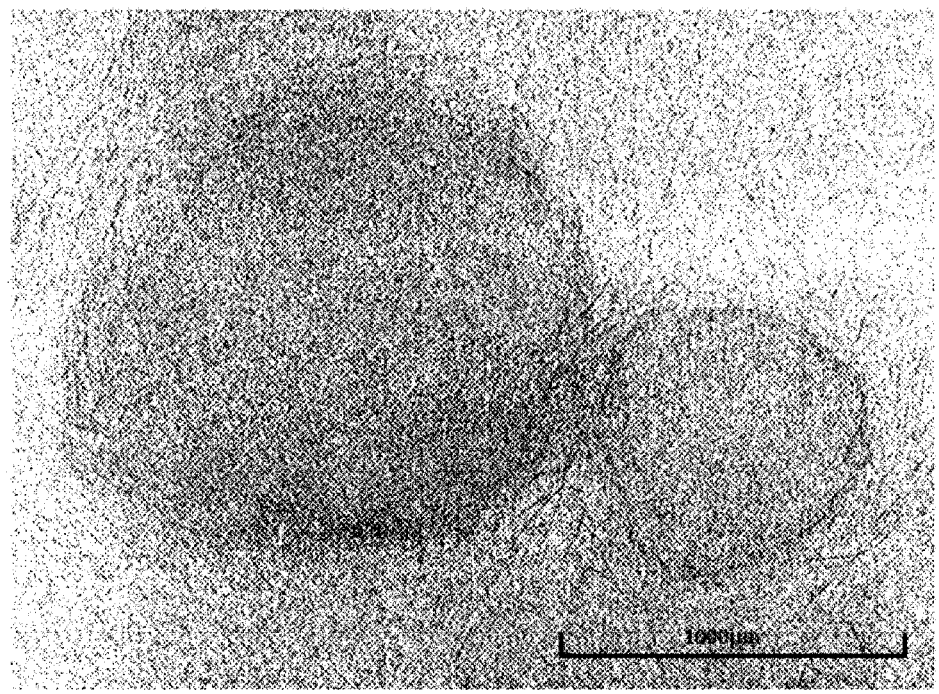
FIG. 3 is a micrograph of a ring-shaped mark on the polyolefin porous membrane, originating from the spherulite of polyolefin.

The inventors of the present invention consider the mechanism of protrusion formation as described in the present invention as follows. Crystallization of polyolefin begins simultaneously as extrusion of melt polyolefin resin and a forming solvent through the die, and the rate of crystallization increases due to rapid quenching by contact with the cooling roll. At this point, spherulites with symmetrical structure containing nuclei are formed (FIG. 2). If heat conduction rate between cooling roll surface and the melt polyolefin resin is relatively small, the rate of crystallization is small, resulting in spherulites containing relatively small nuclei. If heat conduction rate is large, spherulites containing relatively large nuclei are formed. These nuclei in the spherulites form protrusions during stretching in TD (transverse direction) and/or MD (machine direction) in the later process. In addition, spherulites appear as ring-shaped marks on polyolefin porous membrane surface (FIG. 3).

A method of producing a multi-layer polyolefin porous membrane can be selected freely in accordance with the purpose thereof as long as the various characteristics described above are satisfied. Methods of producing porous membranes include the foaming method, the phase-separation method, the melt-recrystallization method, the drawing-pore-opening method, the powder-sintering method and the like, and the phase-separation method is preferred among these from the viewpoints of homogenization of micropores and cost.

Examples of the manufacturing method according to the phase-separation method include a method comprising melting and kneading polyolefin with a forming solvent, extruding the resultant molten mixture through a die, cooling the extrudate to form a gel-like molded product, stretching the obtained gel-like molded product in one or more axes, and removing the forming solvent, to obtain a porous membrane.

[3] Production Method for the Polyolefin Multi-Layer Microporous Membrane

A production method for a multi-layer polyolefin porous membrane according to the present invention will be described hereinafter.

The production method for a multi-layer polyolefin porous membrane according to the present invention comprises the steps of:

(a) preparing a polyolefin resin solution by mixing a forming solvent to polyolefin resin for configuring a layer A, followed by melting and kneading the mixture;

(b) preparing a polyolefin resin solution by mixing a forming solvent to polyolefin resin for configuring a layer B, followed by melting and kneading the mixture;

(c) extruding the polyethylene resin solutions A and B obtained in the steps (a) and (b) through a die, chilling at least one of the polyethylene resin solutions by a cooling roll having a surface, the forming solvent thereon being removed by a unit to remove the forming solvent, and forming a multi-layer gel-like product;

(d) stretching the multi-layer gel-like product in MD (the machine direction) and in TD (the transverse direction) to obtain a multi-layer stretched and molded material;

(e) extracting and removing the forming solvent from the multi-layer stretched and molded material followed by drying, to obtain a multi-layer porous molded material; and (f) treating the multi-layer porous molded material by heat to obtain a multi-layer polyolefin porous membrane.

Furthermore, other steps such as hydrophilization treatment and discharging treatment can be added before, during or after the steps (a) to (f). Also, a re-stretching step can be implemented after the step (0.

Each step will be described in detail hereinafter.

(a), (b) Preparing Polyolefin Resin Solutions A and B by Adding a Forming Solvent to the Polyolefin Resins for Constituting Layer A and Layer B and then Melt-Kneading the Mixtures The forming solvent is not particularly limited as long as it can dissolve polyolefin sufficiently. Examples of forming solvents include aliphatic or cyclic hydrocarbon such as nonane, decane, undecane, dodecane, and liquid paraffin, or mineral oil fractions with their boiling points corresponding to these. A non-volatile solvent such as liquid paraffin is preferable to obtain a gel-like molded product with stable solvent content. Heat-melting is performed by stirring the polyolefin composition or homogeneously mixing polyolefin composition in the extruder at the temperature at which the polyolefin composition can be completely dissolved. Though the heating and melting temperature is dependent of polymer and solvent in a case of stirring the polyethylene composition in the solvent or in the extruder, it is preferable in the range of from 140 to 250° C., for example.

The concentration of the polyolefin resin is from 25 to 40 parts by weight, and preferably from 28 to 35 parts by weight, per 100 parts by weight of the total of the polyolefin resin and the forming solvent. If the polyolefin resin concentration is within the preferable range described above, sufficient number of the nuclei to form protrusions are formed, resulting in sufficient number of protrusions. Additionally, if the polyolefin resin concentration is within the preferable ranges described above, swell and neck-in phenomena at the outlet of the die can be suppressed as the polyolefin resin solution is extruded, and moldability and self-supporting characteristics of the extrudate are maintained.

The difference in resin concentrations between resin solution A and B can produce a multi-layer microporous membrane having a structure with variation in average pore size along the thickness direction (graded structure). The average pore size of the layer formed by the resin solution of lower concentration is larger than the average pore size of the layer formed by the resin solution of higher concentration. The selection between the resin solution A or B for the higher concentration can be made as appropriate depending on physical properties required for the multi-layer microporous membrane. The average pore size of 0.01 to 0.05 µm for an inner layer as a dense structure layer and the average pore size of 1.2 to 5.0 times that of the dense structure layer described above for an outer layer are preferable because balance between ion permeability and pin puncture strength is good.

The method of melting and kneading is not particularly limited, but normally, homogeneous kneading is done in the extruder. This method is suitable for preparing a solution with a high concentration of polyolefin. The melt-kneading temperature differs depending on the polyolefin resin that is used. The lower limit thereof is preferably (the melting point of the polyolefin resin+10° C.) and is more preferably (the melting point of the polyolefin resin+20° C.). The upper limit of the melt-kneading temperature is preferably (the melting point of the polyolefin resin+120° C.) and is more preferably (the melting point of the polyolefin resin+100° C.). Here, the melting point is a value measured by DSC according to JIS K7121 (1987) (the same applies hereinafter). For example, specifically, because the polyolefin composition has a melting point of about from 130 to 140° C., the lower limit of the melt-kneading temperature is preferably 140° C., more preferably 160° C., and most preferably 170° C. The upper limit of the melting and kneading temperature is preferably 250° C., more preferably 230° C. and most preferably 200° C. In addition, in layer B, the polyolefin solution contains a polypropylene, but the melt-kneading temperature thereof is preferably from 190 to 270° C.

From the perspective of preventing resin degradation, the melt-kneading temperature is preferably low. However, if the melt-kneading temperature is lower than the temperatures described above, the extrudate from the die may contain unmelted components, which may cause membrane puncture and the like in the subsequent stretching step. If the melt-kneading temperature is higher than the temperatures described above, the heat decomposition of polyolefin may become excessive, and physical properties such as pin puncture strength and tensile strength in the fine porous membrane that is obtained may be inferior.

A ratio of the length L to the diameter D of a screw of a twin-screw extruder, L/D, is preferably from 20 to 100, from the viewpoint of better kneading processability and better resin dispersion and distributivity. The lower limit of the ratio, L/D, is preferably 35. The upper limit of the ratio, L/D, is preferably 70. When L/D is not less than 20, melt-kneading is sufficient. When L/D is not greater than 100, the retention time of the polyolefin solution can be prevented from increasing excessively. An inner diameter of a cylinder of the twin-screw extruder is preferably from 40 to 100 mm from the perspective of preventing resin degradation during kneading and achieving better dispersion and distributivity.

In order to achieve good dispersion of polyolefin in the extrudate and to obtain excellent thickness homogeneity for the microporous membrane, a screw rotation rate Ns of the biaxial extruder is preferably not less than 150 rpm. Furthermore, a ratio of extrudate amount Q (kg/h) of the polyolefin solution to Ns (rpm), Q/Ns, is preferably not greater than 0.64 kg/h/rpm. The ratio Q/Ns is more preferably not greater than 0.35 kg/h/rpm.

(c) Extruding the Polyethylene Resin Solutions A and B Obtained in the Steps (a) and (b) Through a Die, Chilling at Least One Layer Thereof by a Cooling Roll Having a Surface, the Forming Solvent Thereon being Removed by a Unit to Remove the Forming Solvent, and Forming a Multi-Layer Gel-Like Product The polyolefin resin solutions A and B that are melt-kneaded with the extruder are extruded from the die directly or after further passing through a separate extruder and are cooled with a cooling roll to form a multi-layer gel-like molded product. Methods to obtain the multi-layer gel-like molded product include a bonding method, in which gel-like molded materials to be laminated are prepared separately and bonded together by passing them through calendar rolls and the like, a co-extrusion method, in which polyolefin solutions are supplied to the extruders separately, melted at a desired temperature, brought together by polymer tubes or in the die to be coextruded and laminated, thereby the multi-layer gel-like product can be obtained. From the viewpoint of inter-layer adhesion, the co-extrusion method is preferable.

The polyolefin resin solution extruded from the die is brought into contact with a rolling cooling roll. The surface of the cooling roll is controlled by the refrigerant to the temperature from 20° C. to 40° C. and the gel-like product is formed. The extruded polyolefin resin solution is preferably cooled down to a temperature not higher than 25° C. The cooling rate in the temperature range that the crystallization practically occurs is important. For example, the polyolefin resin solution is cooled at the cooling rate not less than 10° C./sec in the temperature range that the crystallization substantially occurs, and the gel-like molded product is obtained. The cooling rate is preferably not less than 20° C./sec, more preferably not less than 30° C./sec, and even more preferably not less than 50° C./sec. The cooling step described above can immobilize microphase-separated structures in which a polyolefin phase is separated by solvent, form spherulites comprising relatively large nuclei on the surface of the gel-like molded product in contact with the cooling roll and form protrusions with appropriate shapes after stretching. The cooling rate can be estimated from the simulation using parameters such as extruding temperature of the gel-like product, thermal conductivity of the gel-like product, the thickness of the gel-like product, and heat transfer coefficients of the forming solvent, the cooling roll and air.

Figure 4:
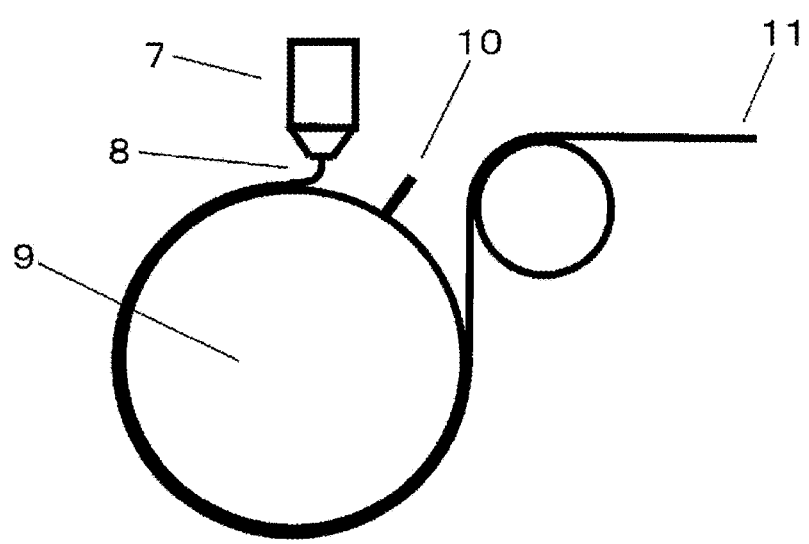
FIG. 4 is a schematic view of the steps to extrude polyolefin resin solution through a die disposed at the end of the extruder and to cool the extrudate by a cooling roll to form a gel-like molded product.

Additionally, in the present invention, it is important to remove a forming solvent deposited on the cooling roll surface, which will be in contact with the polyolefin resin solutions A and/or B extruded from the die, as much as possible. That is, as illustrated in FIG. 4, the polyolefin resin solution is cooled and formed into the gel-like molded product upon contact with the rolling cooling roll and the forming solvent is present on the cooling roll surface after the formed gel-like molded product is removed from the roll. Generally, the roll surface as-is will be in contact with the polyolefin resin solution again. However, a large amount of the forming solvent deposited on the cooling roll surface has a thermal insulation effect, which decelerates the cooling rate and hinders the protrusion formation. Therefore, it is important to remove the forming solvent as much as possible before the portion of the cooling roll that has already been brought into in contact with the polyolefin resin solution is once again brought into contact with the polyolefin resin solution.

The unit for removing the forming solvent—that is, the unit for removing the forming solvent from the cooling roll—is not particularly limited, but a preferable unit comprises placing a doctor blade (member for removing forming solvent) on the cooling roll parallel to the transverse direction of the gel-like molded product and scraping off the forming solvent to the extent that the forming solvent may not be visually observable on the cooling roll surface from the point immediately after the doctor blade to the point of gel-like molded product contact. Alternatively, the forming solvent on the cooling roll can be removed by the unit comprising blowing off the forming solvent by compressed air, the unit comprising pumping out the forming solvent, or a combination of these means. Among these units, the unit using a doctor blade scraping off the forming solvent is preferable since it is relatively easily implemented, and the use of the two or more doctor blades instead of one is more preferable due to improvement in the effective removal of the forming solvent.

The material of the doctor blade is not particularly limited as long as it has resistance to a forming solvent. However, a resin or rubber doctor blade is preferred compared to a metal doctor blade. When the material of the doctor blade is a metal, the doctor blade may damage the cooling roll. Examples of the resin doctor blades include polyester, polyacetal, polyethylene doctor blades and the like.

Even if the cooling roll temperature is set to lower than 20° C., the thermal insulating effect of the forming solvent may not only fail to achieve sufficient cooling rate, but also cause roughening of the surface of the gel-like molded product due to dew formation on the cooling roll.

The thickness of the polyolefin resin solution upon the extrusion is preferably not greater than 1,500 µm, more preferably not greater than 1,000 µm, and even more preferably not greater than 800 µm. If the thickness of the polyolefin resin solution upon the extrusion is within the range described above, it is preferable since the cooling rate of the cooling roll surface is not decelerated.

If the multi-layer gel-like product is obtained by the bonding method, at least one of the polyolefin resin solutions for the layer A or the layer B is formed as a gel-like product under the cooling conditions described above. Meanwhile, for the bonding method, the side, which was in contact with the cooling roll, of the layer formed under the cooling condition described above is required to be the surface of the multi-layer gel-like product. Alternatively, if the multi-layer gel-like product is obtained by the co-extrusion method, the polyolefin resin solutions laminated together are coextruded from the die to form the multi-layer gel-like product under the cooling condition described above.

A configuration of the layers can be at least two layers of the layer A and the layer B, from the viewpoint of balance of physical properties such as shut-down characteristics, mechanical strength and permeability. However, from the viewpoint of balance between two sides of the final film, three-layer configuration, that is layer A/layer B/layer A or layer B/layer A/layer B, is preferred. From the perspective of adhesion to the modified porous layer, protrusions may be formed either on layer A or layer B. However, from the perspective of enhancing anti-oxidation properties, it is preferable to use layer B containing a polypropylene as a surface layer. On the other hand, the surface layer is preferably used as layer A from the perspective of suppressing the generation of powder or the like due to the fallout of propylene at the time of membrane production.

The ratio of the layer B is preferably not less than 30 mass % and not greater than 80 mass % per a total mass of all the layers. The lower limit of the ratio of layer B is preferably 40 mass %, and the upper limit is preferably 70 mass %. When the ratio of layer B is within the range described above, it is possible to achieve a good balance between the meltdown characteristics and the permeability stability and puncture strength in the separator usage range.

(d) Stretching the Multi-Layer Gel-Like Product in MD (the Machine Direction) and in TD (the Transverse Direction) to Obtain a Stretched and Molded Material Next, the multi-layer gel-like molded product is stretched to form a stretched and molded material. Stretching involves heating of the gel-like molded product and stretching the gel-like molded product in MD and TD at the pre-determined magnifications using usually a tenter method, roll method or combination thereof. Stretching may be simultaneous stretching (simultaneous biaxial stretching) in MD and TD (machine direction and transverse direction) or may be sequential stretching. The order of the sequential stretching can be any one of the ordering between MD and TD, and stretching in MD and/or TD can be multiple steps. Additionally, the magnification of the stretching is dependent of the thickness of the material, planar magnification is preferably not less than 9 and more preferably from 16 to 400. In case of simultaneous stretching in MD and TD (simultaneous biaxial stretching), the identical magnification for MD and TD, such as 3×3, 5×5 and 7×7, is preferred. The planar magnification within the preferable range described above provides sufficient stretching and results in the porous membrane with high modulus and large strength. Also, by controlling the stretching temperature, the desirable air permeation resistance can be obtained.

The stretching temperature is preferably not higher than the melting point of the polyolefin resin and is more preferably in a range of the crystalline dispersion temperature Tcd of the polyolefin resin to the melting point of the polyolefin resin. When the stretching temperature is not higher than the melting point of the gel-like sheet, the melting of the polyolefin resin is prevented, which makes it possible to efficiently align the molecular chains by stretching. In addition, when the stretching temperature is not higher than the crystalline dispersion temperature of the polyolefin resin, the softening of the polyolefin resin is sufficient, and the stretching tension is low. Therefore, the membrane forming characteristics are favorable, and stretching can be performed at a high ratio with a low likelihood of membrane puncture at the time of stretching. The crystalline dispersion temperature Tcd can be determined from the temperature characteristics of the dynamic visco-elasticity measured in accordance with ASTM D 4065. The crystalline dispersion temperature Tcd may also be determined by NMR.

(e) Extracting and Removing the Forming Solvent from the Multi-Layer Stretched and Molded Material Followed by Drying, to Obtain a Multi-Layer Porous Molded Material In this step, the stretched and molded material is treated with washing solvent to remove residual forming solvent, and the multi-layer porous membrane is obtained. The washing solvents that can be used are volatile solvents, and include hydrocarbons such as pentane, hexane, and heptane, chlorinated hydrocarbons such as methylene chloride and carbon tetrachloride, fluorinated hydrocarbons such as trifluoroethane, and ethers such as diethylether and dioxane. These washing solvents are appropriately selected according to the forming solvent used to dissolve polyolefin and can be used alone or as a mixture. The washing method includes immersion and extraction in the washing solvent, showering the washing solvent, suctioning the washing solvent from the opposite side of the stretched and molded material and combinations thereof. Washing described above is continued until the residual solvent in stretched and molded material reaches less than 1 wt. %. After the washing, the washing solvents are dried off. The method of drying off the washing solvents include heat drying, air-dry and the like.

(f) Treating the Multi-Layer Porous Molded Material by Heat to Obtain a Polyolefin Porous Membrane The multi-layer porous molded material obtained by drying further undergoes thermal treatment to obtain a multi-layer porous membrane. The thermal treatment temperature is preferably from 90 to 150° C. The thermal treatment temperature within the preferable range described above can achieve sufficient reduction in thermal shrinkage and air permeation resistance of the multi-layer polyolefin porous membrane obtained. The residence time of the thermal treatment step is not particularly limited, but generally is not less than 1 second and not more than 10 minutes, and preferably from 3 seconds to not more than 2 minutes. The thermal treatment can be done by any of the methods among the tenter method, roll method, pressing method, or free method.

Furthermore, it is preferable to shrink the porous molded material in at least one of MD (machine direction) and TD (transverse direction), while the porous molded material is fixed in both directions, MD and TD, in the thermal treatment step. If the shrinking of the porous molded material in MD and/or TD is not performed while the porous molded material is fixed in both directions, MD and TD, the thermal shrinkage of the porous molded material may be deteriorated. The ratio of shrinking the porous molded material in at least one of MD and TD, is from 0.01 to 50%, and preferably 3 to 20%. The ratio of shrinking within the preferable range described above improves the heat shrinkage after 8 hours at 105° C. and maintains air permeation resistance. Also, in order to improve pin puncture strength, re-stretching of about from 5% to 20% in TD and/or MD may be performed before heat-setting treatment.

Furthermore, hydrophilization treatment can be optionally applied to the stretched and molded material, the porous molded material or the microporous membrane. By performing the hydrophilization treatment, for example, adhesion between the microporous membrane surface and a heat-resistant resin layer and homogeneity of coated membrane can be improved when the heat-resistant resin layer is coated. Hydrophilization treatment can be performed by monomer graft, surfactant treatment, corona discharge and the like. Monomer graft is preferably performed before the crosslinking treatment. Corona discharge treatment can be performed in air, nitrogen, or mixed atmosphere of nitrogen and carbon dioxide.

The modified porous layer used in the present invention is described below.

A modified porous layer is preferably laminated on the side having protrusions of the multi-layer polyolefin porous membrane. When modified porous layers are disposed on the both sides of the multi-layer polyolefin porous membrane, it is preferable that the side, on which the modified porous layer is laminated on the side having protrusions of the polyolefin porous membrane, is set to the side on which a larger amount of forces parallel to the modified porous layer surface is applied due to contact with rolls or bars during the later processes such as the slit process and transport process, since the effect of the present invention can be demonstrated effectively.

A modified porous layer described in the present invention is not particularly limited if the layer includes functionalized resin, namely, resin that provides or improves at least one of the functions among heat resistance, adhesion to an electrode material, wettability toward electrolytic solution and the like. The modified porous layers preferably include inorganic particles or cross-linked polymeric particles in addition to functionalized resin.

As a functionalized resin, from the viewpoint of heat resistance improvement, for example, the heat-resistant resin used preferably has glass transition temperature or melting point not lower than 150° C., more preferably not lower than 180° C., and even more preferably not lower than 210° C. It is not particularly necessary to specify the upper limit of the glass transition temperature or melting point of the functionalized resin. If the glass transition temperature of the functionalized resin is higher than the degradation temperature, the degradation temperature may be within the range described above. If the lower limit of the glass transition temperature of the functionalized resin is within the preferable range described above, sufficient heat-resistant membrane puncture temperature can be established and the great degree of safety is maintained.

As heat-resistant resin, for example, resin which comprises polyamideimide, polyimide or polyamide as a major ingredient can be used preferably. Among these, the resin comprising polyamideimide as a major ingredient is particularly preferred. These resin can be used alone or in combination with the other materials as a heat-resistant resin.

From the viewpoint of adhesion to electrodes, it is preferable to use one or more kinds of resin selected from the group consisting of vinylidene fluoride homopolymer, vinylidene fluoride/olefin fluoride copolymer, vinyl fluoride homopolymer and vinyl fluoride/olefin fluoride copolymer, as functionalized resin. Polytetrafluoroethylene is particularly preferable as a functionalized resin. These polymers can sustain sufficient affinity toward electrolytic solution during use at high temperatures, since they have sufficient adhesion to electrodes, great affinity toward non-aqueous electrolytic solution, appropriate heat resistance and great chemical and physical stability toward non-aqueous electrolytic solution. In addition, polyvinylidene fluoride (PVDF) is suitable as a functionalized resin.

The details of the functionalized resin are described below using polyamideimide resin as an example.

In general, the synthesis of polyamideimide resin includes normal methods such as the acid chloride method, in which trimellitic chloride and diamine are used, the diisocyanate method, in which trimellitic anhydride and diisocyanate are used. The diisocyanate method is preferable from the viewpoint of manufacturing cost.

An acid component used for the synthesis of polyamideimide resin includes trimellitic anhydride (chloride) and some parts of the acid component may be substituted with the other polybasic acid or anhydride thereof. Examples of other polybasic acids or anhydrides thereof include tetracarboxylic acids and anhydrides thereof such as pyromellitic acid, bipheny tetracarboxylic acid, biphenylsulphone tetracarboxylic acid, benzophenone tetracarboxylic acid, biphenylether tetracarboxylic acid, ethyleneglycol bis-trimellitate, propyleneglycol bis-trimellitate and the like, aliphatic dicarboxylic acids such as oxalic acid, adipic acid, malonic acid, sebacic acid, azelaic acid, dodecane dicarboxylic acid, dicarboxy polybutadiene, dicarboxy poly(acrylonitrile-butadiene), dicarboxy poly(styrene-butadiene) and the like, alicyclic dicarboxylic acids such as 1,4-cyclohexane dicarboxylic acid, 1,3-cyclohexane dicarboxylic acid, 4,4'-dicyclohexyl methane dicarboxylic acid, dimer acid and the like, aromatic dicarboxylic acids such as terephthalic acid, isophthalic acid, diphenylsulphone dicarboxylic acid, diphenyether dicarboxylic acid, naphthalene dicarboxylic acid and the like. Among these examples, 1,3-cyclohexane dicarboxylic acid and 1,4-cyclohexane dicarboxylic acid are preferable from the viewpoints of electrolytic solution resistance, and dimer acid, dicarboxy polybutadiene with molecular weight not less than 1,000, dicarboxy poly(acrylonitrile-butadiene) and dicarboxy poly(styrene-butadiene) are preferable from the viewpoint of shut-down characteristics.

Also, a urethane group may be introduced into the molecule by substituting the part of trimellitic acid compound with glycol. The glycol includes alkylene glycol such as ethylene glycol, propylene glycol, tetramethylene glycol, neopentyl glycol, hexandiol and the like, polyalkylene glycol such as polyethyleneglycol, polypropylene glycol, polytetramethylene glycol and the like, polyester with hydroxy terminal group synthesized from one or more kinds of dicarboxylic acids described above and one or more kinds of glycol described above and the like. Among these, polyethyleneglycol and polyester with hydroxy terminal group are preferred from the viewpoint of shut-down effect. In addition, the number-average molecular weight of the glycol or polyester with a hydroxy terminal group is preferably not less than 500, and more preferably not less than 1,000. The upper limit of the number-average molecular weight of the glycol or polyester with a hydroxy terminal group is not particularly limited but is preferably less than 8,000.

If a part of the acid component used in the synthesis of the polyamideimide resin is substituted with at least one of the group consisting of dimer acid, polyalkylene ether, polyester, and butadiene-based rubber containing any one of carboxyl group, hydroxyl group and amino group at the terminal, it is preferable to substitute the amount from 1 to 60 mol % of the acid component.

A composition containing o-tolidine and tolylenediamine as components is preferable as the diamine (diisocyanate) component used in the synthesis of the polyamideimide resin. Examples of components substituted for parts thereof include aliphatic diamine such as ethylenediamine, propylenediamine and hexamethylenediamine and diisocyanates thereof, alicyclic diamine such as 1,4-cyclohexanediamine, 1,3-cyclohexanediamine and dicyclohexylmethanediamine and diisocyanates thereof, and aromatic diamine such as m-phenylenediamine, p-phenylenediamine, 4,4'-diaminodiphenyl methane, 4,4'-diaminodiphenyl ether, 4,4'-diaminodiphenyl sulfone, benzidine, xylylenediamine and naphthalene diamine and diisocyanates thereof. Among these, dicyclohexylmethanediamine and diisocyanate thereof are most preferable, and 4,4'-diaminodiphenyl methane, naphthalenediamine and diisocyanates thereof are preferable from the viewpoints of reactivity, costs and electrolytic solution resistance. Of these components, o-tolidine diisocyanate (TODI), 2,4-tolidine diisocyanate (TDI) and blends thereof are particularly preferable. Furthermore, in order to improve the 0° peel strength of the modified porous layer, the content of o-tolidine diisocyanate (TODI) having high rigidity among these components is not less than 50 mol %, preferably not less than 60 mol %, and even more preferably not less than 70 mol %, based on the total amount of all isocyanates.

The polyamideimide resin can be easily produced by stirring in a polar solvent such as N,N'-dimethylformamide, N,N'-dimethylacetamide, N-methyl-2-pyrrolidone, or γ-butyrolactone while heating at from 60 to 200° C. In this case, amine such as triethylamine or diethylene triamine, or an alkali metal salt such as sodium fluoride, potassium fluoride, cesium fluoride or sodium methoxide can also be used optionally as a catalyst.

When the polyamideimide resin is used in the present invention, the logarithmic viscosity thereof is preferably not less than 0.5 dL/g. If the logarithmic viscosity of the polyamideimide resin is within the preferable range described above, the melt-down characteristics can be sufficiently achieved and the multi-layer polyolefin porous membrane can be prevented from becoming fragile. In addition, when the logarithmic viscosity of the polyamideimide resin is within the range described above, the 0° peel strength is enhanced by an anchor effect. On the other hand, taking into consideration processability or solvent solubility, the logarithmic viscosity of the polyamideimide resin is preferably less than 2.0 dL/g.

The modified porous layer of the present invention can be obtained by coating a resin solution (referred to as varnish in some cases, hereafter) dissolved in a solvent, which can dissolve functionalized resin and miscible with water, on a predetermined substrate, phase-separating the functionalized resin and the solvent under the humidified condition, and solidifying the resin under water bath (referred to as a coagulating bath in some cases, hereafter). A phase-separation assisting agent can be added to varnish as necessary.

Solvents to dissolve the functionalized resin include N,N-dimethyl acetamide (DMAc), N-methyl-2-pyrrolidone (NMP), hexamethylphosphoric triamide (HMPA), N,N-dimethylformamide (DMF), dimethyl sulfoxide (DMSO), γ-butyrolactone, chloroform, tetrachloroethane, dichloroethane, 3-chloro naphthalene, parachlorophenol, tetralin, acetone, acetonitrile and the like, and it can be selected according to the solubility of the resin without restriction.

Solid concentration of the varnish is not particularly limited as long as it can be coated uniformly, but it is preferably not less than 50 wt. % and not greater than 98 wt. % and more preferably not less than 80 wt. % and not greater than 95 wt. %. The solid concentration of the varnish within the preferable range described above can prevent the modified porous layer from becoming fragile and achieve sufficient 0° peel strength of the modified porous layer.

Phase-separation assisting agents used in the present invention is one or more kinds of agents selected from water, alkylene glycol such as ethylene glycol, propylene glycol, tetramethylene glycol, neopentyl glycol, hexandiol and the like, polyalkylene glycol such as polyethylene glycol, polypropylene glycol, polytetramethylene glycol and the like, water soluble polyester, water soluble polyurethane, polyvinylalcohol, carboxymethylcellulose and the like.

The amount of phase-separation assisting agent added is preferably from 10 to 90 wt. %, more preferably from 20 to 80 wt. % and even more preferably from 30 to 70 wt. % based on the weight of the varnish solution. Mixing these phase-separation assisting agents to the varnish can mainly control the air permeation resistance, the surface open porosity and the rate of layer structure formation. When the added amount of the phase-separation assisting agent is within the preferable range described above, the rate of phase separation is significantly increased. In addition, when the added amount of the phase-separation assisting agent is within the preferable range described above, this prevents the resin solution from becoming turbid and resin component from deposited during mixing.

In order to reduce the curl of the multi-layer polyolefin porous membrane caused by laminating the modified porous layer, it is important to add inorganic particles or cross-linked polymeric particles to the varnish. Addition of inorganic particles or cross-linked polymeric particles to the varnish can prevent internal shorting caused by growth of dendrite crystals of the electrodes inside the battery (anti-dendrite formation effect), reduce the thermal shrinkage and provide lubrication. The upper limit for the amount of the particles added is preferably 98 wt. % and more preferably 95 wt. %. The lower limit for the amount of the particles added is preferably 80 wt. %, and more preferably 85 wt. %. When the amount of the particle added is within the preferable range described above, the reduction of the curl is sufficient, the ratio of the functionalized resin based on the total volume of the modified porous layer is the most suitable and sufficient 0° peel strength of the modified porous layer can be obtained.

Examples of inorganic particles include calcium carbonate, calcium phosphate, amorphous silica, crystalline glass fillers, kaolin, talc, titanium dioxide, alumina, silica-alumina conjugate oxide particles, barium sulfate, calcium fluoride, lithium fluoride, zeolite, molybdenum sulfide, mica and the like. Examples of heat-resistant cross-linked polymeric particles include cross-linked polystyrene particles, cross-linked acrylate-based resin particles, cross-linked methylmethacrylate based particles and the like.

The average size of these particles is preferably not less than 1.5 times and not greater than 50 times as large as the average pore size of the multi-layer polyolefin porous membrane. The average size of these particles is more preferably not less than 2.0 times and not greater than 20 times as large as the average pore size of the multi-layer polyolefin porous membrane. When the average size of the particles is within the preferable range described above, the pores in the multi-layer polyolefin porous membrane may be blocked while the heat-resistant resin and the particles coexist, and air permeation resistance can be maintained as a result. Meanwhile, it can prevent shedding of particles during the battery assembly process, which may cause serious failure of the battery.

The shape of the particles includes spherical shape, substantially spherical shape, plate shape, needle shape, or polyhedron shape. But it is not particularly limited.

The thickness of the modified porous layer is from 1 to 5 µm, preferably from 1 to 4 µm and more preferably from 1 to 3 µm. If the thickness of the modified porous layer is within the preferable range described above, a battery separator obtained by laminating the modified porous layer can maintain membrane puncture resistance and electrical insulation in the event of melting/shrinking at the melting point or higher and prevent abnormal reaction by having sufficient pore blocking function. In addition, when the membrane thickness of the modified porous layer is within the preferable range described above, the volume upon winding can be reduced, which makes the composition suitable for an increase in battery capacity. Furthermore, when the membrane thickness of the modified porous layer is within the preferable range described above, a reduction in the curl leads to enhanced productivity in the battery assembly process.

The porosity of the modified porous layer is preferably from 30 to 90%, and more preferably from 40 to 70%. If the porosity of the modified porous layer is within the preferable range described above, a battery separator obtained by laminating the modified porous layer has low electrical resistance and can serve a large current. Also the membrane strength can be maintained.

The upper limit for the total thickness of the battery separator obtained by laminating the modified porous layer is preferably 25 µm, and more preferably 20 µm. The lower limit of the total thickness of the battery separator obtained by laminating the modified porous layer is preferably not less than 6 µm, and more preferably not less than 7 µm. When the thickness of the whole battery separator is within the preferable range described above, the battery separator obtained by laminating the modified porous layer can achieve sufficient mechanical strength and electrical insulation. In addition, when the membrane thickness of the entire battery separator is within the preferable range described above, capacity reduction can be avoided since the electrode area filling the container can be reduced.

The air permeation resistance of the battery separator is one of the most important characteristics and preferably ranges from 50 to 600 sec/100 cc Air, more preferably from 100 to 500 sec/100 cc Air, and even more preferably from 100 to 400 sec/100 cc Air. When the air permeation resistance of the battery separator is within the preferable range described above, sufficient electrical insulation can be achieved and clogging, shorting and membrane puncture can be avoided. In addition, reduction in the membrane electrical resistance can achieve charge/discharge characteristics and battery life characteristics within the range of practical use.

The method of laminating the modified porous layer of the battery separator of the present invention is described below.

The method of laminating the modified porous layer on the multi-layer polyolefin porous membrane may be a method, in which the varnish is directly coated onto the multi-layer polyolefin porous membrane and converted to the modified porous layer (the direct method), or a method, in which the varnish is coated on a substrate film (e.g. polypropylene film or polyester film), phase-separated for the functionalized resin component and the solvent component and converted to the modified porous layer under the specified humidified environment, followed by transfer to the multi-layer polyolefin porous membrane to produce the laminate (the transfer method).

In the present invention, the preferable method for laminating the modified porous layer comprises the steps (i) and (ii) in the manufacturing steps.

Step (i): a step to form a functionalized resin membrane on the multi-layer polyolefin porous membrane by applying a varnish containing a functionalized resin and inorganic particles or crosslinked polymeric particles to the multi-layer polyolefin porous membrane and then passing the composition through a low-humidity zone having an absolute humidity of not less than 0.5 g/m$^3$ and less than 6 g/m$^3$ and a high-humidity zone having an absolute humidity of not less than 7.0 g/m$^3$ and less than 25.0 g/m$^3$. Step (ii): a step to produce a battery separator, in which the composite membrane laminated with the functionalized resin layer obtained in the step (i) is immersed in a coagulating bath so that the functionalized resin layer is converted to a modified porous layer, followed by washing and drying.

The further details are described below.

The varnish comprising the functionalized resin solution, in which the functionalized resin is dissolved in the solvent capable of dissolving the functionalized resin and miscible with water, and inorganic particles or cross-linked polymeric particles as major ingredients, is coated on the multi-layer polyolefin porous membrane. Then, the varnish-coated multi-layer polyolefin porous membrane is placed under the specific humidified environment, and the varnish is phase-separated. Then, the functionalized resin is solidified in the water bath (coagulating bath) and the modified porous layer is obtained.

A low-humidity zone in the present invention is a zone having an absolute humidity of less than 6 g/m$^3$, and having an upper limit of absolute humidity controlled to preferably 4 g/m$^3$ and more preferably 3 g/m$^3$ and a lower limit of absolute humidity controlled to 0.5 g/m$^3$ and preferably 0.8 g/m$^3$. When the absolute humidity is within the preferable range described above, the phase-separation is sufficiently achieved to become porous and the increase in air permeation resistance is reduced. In addition, along with phase-separation, the solidification of the resin configuring the modified porous layer is suppressed, penetration of the resin component configuring the modified porous layer into the multi-layer polyolefin porous membrane can be achieved sufficiently. As a result, the sufficient 0° peel strength of the modified porous layers can be obtained. Also, if the time required for passing through the low-humidity zone is less than 3 seconds, the phase separation described above is not sufficiently progressed. If the time required for passing through the low-humidity zone is more than 20 seconds, solidification of the resin configuring the modified porous layer is unpreferably progressed.

Next, the coated membrane is passed through the high-humidity zone for not less than 3 seconds but not more than 10 seconds.

A high-humidity zone in the present invention is a zone having a lower limit of absolute humidity controlled to 6 g/m$^3$, preferably 7 g/m$^3$, and more preferably 8 g/m$^3$ and an upper limit of absolute humidity controlled to 25 g/m$^3$, preferably 17 g/m³, and more preferably 15 g/m³. When the absolute humidity is within the preferable range described above, gelation (immobilization) can be sufficiently achieved, excessive penetration of the resin component configuring the modified porous layer into the multi-layer polyolefin porous membrane may not occur, and the increase in the air permeation resistance can be reduced. In addition, when the absolute humidity is within the preferable range described above, excessive solidification of the resin component and excessive reduction in penetration of the functionalized resin component into the multi-layer polyolefin porous membrane can be prevented, and sufficient 0° peel strength can be obtained.

Though the temperature condition is not particularly limited, as long as the absolute humidity is within the range described above for both the low-humidity zone and the high-humidity zone, it is preferable to be not lower than 20° C., and not higher than 50° C. from the viewpoint of energy savings.

Examples of the method of coating the varnish include a reverse roll coating method, a gravure coating method, a kiss coating method, a roll brush method, a spray coating method, an air knife coating method, a meyer-bar coating method, a pipe doctor method, a blade coating method and a die coating method, and these methods can be used alone or in combination thereof.

In the coagulating bath, the resin component and the particles are solidified in a three-dimensional mesh-like pattern. The duration for immersing in the coagulating bath is preferably not less than 3 seconds. When the time duration for immersing in the coagulating bath is within the preferable range described above, the sufficient solidification of the resin component can be achieved. The upper limit of the time duration for immersing in the coagulating bath is not particularly limited, but 10 seconds may be sufficient.

Furthermore, the porous membrane prior to the washing is immersed in the aqueous solution containing the solvent suitable for the functionalized resin in the amount from 1 to 20 wt. %, preferably from 5 to 15 wt. %, subsequently followed by the washing process using pure water and drying process using hot air of temperature not higher than 100° C. in this order, and the final battery separator can be thereby obtained.

For washing, general methods such as warming, ultrasonic irradiation or bubbling can be used. Furthermore, to maintain the concentration of each bath constant and improve washing efficiency, a method of removing a solution inside the porous membrane between baths is effective. Specific examples thereof include a method of forcing out a solution within a porous layer by air or an inert gas and a method of physically squeezing out a solution within a membrane by a guide roll.

It is desirable to store the battery separator of the present invention in a dry state. However, if storage in an absolute dry state is difficult, the battery separator is preferably subjected to a vacuum drying treatment at the temperature not higher than 100° C. just before use.

The battery separator of the present invention can be used for separators in rechargeable batteries such as nickel-metal hydride batteries, nickel-cadmium batteries, nickel-zinc batteries, silver-zinc batteries, lithium rechargeable batteries, lithium polymer rechargeable batteries and the like, plastic film capacitors, ceramic capacitors, electric double layer capacitors and the like, but is preferably used as a separator for lithium ion rechargeable batteries. The use of the separator of the present invention as a separator in a lithium ion rechargeable battery is described below as an example.

In lithium ion rechargeable batteries, a cathode and an anode are laminated with a separator interposed therebetween, and the separator contains an electrolytic solution (an electrolyte). The structure of the electrode is not particularly limited, and can be a known structure. For example, an electrode structure in which disc-shaped cathode and anode are placed to face each other (coin type), an electrode structure in which planar cathode and anode are alternately laminated (lamination type), an electrode structure in which band-shaped cathode and anode are overlapped and wound (winding type) and the like can be employed.

The cathode normally comprises a current collector and a cathode active material layer formed on the surface of the current collector and containing a cathode active material capable of absorbing and desorbing lithium ions. Examples of the cathode active material include inorganic compounds such as a transition metal oxide, a composite oxide of lithium and a transition metal (lithium composite oxide), a transition metal sulfide and the like. Examples of the transition metal include V, Mn, Fe, Co, Ni and the like. Preferred examples of the lithium composite oxide among the cathode active materials include lithium nickel oxide, lithium cobalt oxide, lithium manganese oxide, a lamellar lithium composite oxide having an α-NaFeO₂-type structure as matrix and the like.

The anode includes a current collector and an anode active material layer formed on the surface of the current collector and containing an anode active material. Examples of the anode active material include carbonaceous materials such as natural graphite, artificial graphite, cokes, carbon black and the like. An electrolytic solution is obtained by dissolving a lithium salt in an organic solvent. Examples of lithium salts include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, $LiN(C_2F_5SO_2)_2$, $LiPF_4(CF_3)_2$, $LiPF_3(C_2F_5)_3$, lower aliphatic carboxylate lithium salts, and $LiAlCl_4$. These can be used alone or in combination of two or more kinds thereof. Examples of the organic solvent include an organic solvent having a high boiling point and a high dielectric constant such as ethylene carbonate, propylene carbonate, ethylmethyl carbonate, γ-butyrolactone and the like, and an organic solvent having a low boiling point and a low viscosity such as tetrahydrofuran, 2-methyltetrahydrofuran, dimethoxyethane, dioxolane, dimethyl carbonate, diethyl carbonate and the like. These can be used alone or in combination of two or more kinds thereof. Particularly, because an organic solvent having a high dielectric constant has a high viscosity, and an organic solvent having a low viscosity has a low dielectric constant, a mixture of each type of an organic solvent is preferably used.

Upon assembling a battery, the separator of the present invention can be impregnated with an electrolytic solution to provide the separator with ion permeability. Usually, an impregnation treatment is carried out by immersing a microporous membrane in an electrolytic solution at normal temperature. For example, when a cylindrical battery is assembled, first a cathode sheet, a separator (composite porous membrane), and an anode sheet are laminated in this order, and the laminate is wound up from one end to form a winding-type electrode element. Then, this electrode element is inserted into a battery can, and impregnated with the electrolyte solution described above, followed by caulking a battery cap having a safety valve and serving as a cathode terminal via a gasket. Thereby a battery can be obtained.

EXAMPLES

The present invention is described below using examples. However, the present invention is not limited by these examples in any way. The measurement values in the examples are the values measured by the methods described below.

1. Number of Protrusions

The numbers and sizes of the protrusions were measured using a confocal microscope (HD100, manufactured by Lasertec Corporation) placed on a vibration isolation platform after the light source was stabilized.

Procedure (1) On the surface of the polyolefin porous membrane obtained by examples or comparative examples, the surface being the one in contact with the cooling roll during the manufacturing, a square frame of 1 cm×1 cm in size was drawn with a fine-point permanent marker.

(2) The sample was placed on the sample stage with the surface with the drawn square up, and was fixed firmly to the sample stage using the electrostatic adhesion apparatus, the accessory of the confocal microscope.

(3) Using the objective lens with magnification of 5 times, a ring-shaped mark originating from a polyolefin spherulite as in FIG. 3 was displayed on the monitor as a two-dimensional image (called REAL screen for this microscope), and the position of the sample stage was adjusted so that the darkest part of the ring-shaped mark was approximately at the center of the monitor screen. When two ring-shaped marks were connected, the stage was adjusted so that a point of contact was at the center of the monitor screen. The protrusion height was measured only for the ring-shaped mark originating from the polyolefin spherulite with its major axes not less than 0.2 mm. The major axis length of a ring-shaped mark was measured by reading the length between two ends of the ring-shaped mark using a cursor on the two-dimensional image described above.

(4) Changing the objective lens to the one with magnification of 20 times, the reference height (called REF SET in this microscope) was set to the height when the focus was adjusted to the center area of the monitor screen (so that the center area of the monitor screen was displayed most brightly in this microscope).

(5) The measurement range in the height direction was set to 15 µm up and down relative to the reference height as 0 µm described above. Also, the scan time was 120 seconds, STEP transport distance was 0.1 µm/Step and the three-dimensional data was acquired.

(6) After the acquisition of the three-dimensional data, the image for data processing (Z image in this microscope) was displayed and smoothing process was applied (the conditions for smoothing are: the size of filter: 3×3, matrix type: SMOOTH3-0, the number of process: 1). In addition, plane correction was applied optionally in the plane correction window as necessary.

(7) The cursor was positioned horizontally on the position intersecting the highest protrusion in the image for data processing (the brightest position) and the cross-sectional profile corresponding to the cursor was displayed on the cross-sectional profile image.

(8) The protrusion size was measured by positioning the two vertical cursors to the inflection points at each side of the skirt of the protrusion in the cross-sectional profile image, and was defined as the distance between the two cursors.

(9) The protrusion height was measured by positioning the two horizontal cursors to the peak of the protrusion and the inflection points at each side of the skirt of the protrusion (the lower inflection point if the two inflection points at each side of the skirt of the protrusion were different in height), and was defined as the distance between two cursors.

(10) The operation described above was repeated inside the square of 1 cm×1 cm described above, the protrusions with size not less than 5 µm and not greater than 50 µm, and with height not less than 0.5 µm and not greater than 3.0 µm, were counted. Thus the number of the protrusions per 1 cm$^2$ was determined, and the average height of the protrusions was determined.

2. 0° Peel Strength of Modified Porous Layer

FIG. 1 schematically illustrates the evaluation method. Reference numeral 1 denotes a multi-layer sample, 2 denotes a multi-layer polyolefin porous membrane, 3 denotes a modified porous layer, 4 denotes a double-sided adhesive tape, 5 and 5' denote aluminum plates, and the arrow in the figure indicates the direction of tensile force. On the aluminum plate 5, which was 50 mm×25 mm in size and 0.5 mm in thickness, a piece of double-sided tape 4 (NW-K50, manufactured by Nichiban) of the same size thereof was adhered. The surface of the multi-layer polyolefin porous membrane 2 of the sample 1 (the battery separator), cut out in the size of 50 mm in width and 100 mm in length, was adhered on the aluminum plate 5 above, so that the 40 mm portion of the sample, measured from one of the 25 mm long edges of the aluminum plate 5, was overlapped and adhered together, while the protruded portion was cut out. Next, a double-sided adhesive tape was adhered on one side of the aluminum plate 5', 100 mm in length, 15 mm in width and 0.5 mm in thickness. And the 20 mm portion of the sample, measured from one of the 25 mm long edges of the aluminum plate 5, was overlapped and adhered together. Then, the aluminum plate 5 and the aluminum plate 5', which interposed the sample, were attached to the tensile tester (Autograph AGS-J 1 kN, manufactured by Shimadzu Corp.), and the load was applied on the aluminum plate 5 and the aluminum plate 5' in parallel but in opposite directions, at a tensile velocity of 10 mm/min, and the strength at which the modified porous layer was delaminated was measured. The measurement was performed for any three points separated not less than 30 cm from each other in the longitudinal direction, and the average value thereof was recorded as the 0° peel strength of the modified porous layer.

3. Membrane Thickness

The membrane thickness was determined by averaging 20 measurements using a contact-type membrane thickness meter (Litematic VL-50A, manufactured by Mutsutoyo). An ultrahard spherical contact point of φ9.5 mm was used and measurements were done at 0.01 N measuring force.

4. Average Pore Size of Surface Layer

The average pore size of the surface layer of the multi-layer polyolefin porous membrane was measured by the methods below. A sample was fixed on a measuring cell using a double-sided adhesive tape, on which platinum or gold was vacuum-deposited for several minutes, and the SEM measurement was conducted for the surface of the membrane under appropriate magnification. Any 10 points in an image obtained in the SEM measurement were selected, an average value of pore diameters at the 10 points was determined as an average pore size of the sample.

5. Air Permeation Resistance

Using Gurley Type Densometer Model B manufactured by TESTER SANGYO CO., LTD, the multi-layer polyolefin porous membrane or the battery separator, which was fixed between a clamping plate and an adapter plate so that no winkle occurred, was measured in accordance with JIS P8117. A 10 cm-square sample was used, the measurement was performed for total of 5 points as measurement points, including the center and four corners of the sample. An average value of 5 points was used as air permeation resistance [sec/100 cc Air]. In the case where the length of one side of the sample was less than 10 cm, a value obtained by the measurement for 5 points at intervals of 5 cm may be used.

6. Meltdown Temperature

A 10 mm (TD)×3 mm (MD) test piece, which was under a constant tension of 2 gf in the longitudinal direction, was heated from room temperature at a rate of 5° C./min using a thermomechanical analysis device (TMA/SS6000 manufactured by Seiko Electronic Industries Co., Ltd.), and the temperature at which the membrane punctured due to melting was recorded as the meltdown temperature.

7. Weight Average Molecular Weight (Mw) and Molecular Weight Distribution (Mw/Mn)

Mw and Mw/Mn were determined by gel permeation chromatography (GPC) under the following measurement conditions.

Measurement apparatus: GPC-150C, manufactured by Waters Corporation

Column: Shodex UT806M, manufactured by Showa Denko, K. K.

Column temperature: 135° C.

Solvent (mobile phase): o-dichlorobenzene

Solvent flow rate: 1.0 ml/min

Sample Concentration: 0.1 mass % (dissolution condition: 135° C./1 h)

Injection quantity: 500 μl

Detector: differential refractometer manufactured by Waters Corporation.

Calibration curve: Created using predetermined conversion constant from calibration curve obtained using monodisperse polystyrene standard sample 8. Polypropylene Heat of Fusion ($\Delta H_m$)

A sample of approximately 5 mg was placed in aluminum sample pan which was precisely weighed in advance, and the mass of the sample pan containing the sample was then precisely weighed. The difference relative to the sample pan mass was used as the sample mass. The sample pan containing the sample was left to stand in a sample holder of a differential scanning calorimeter (Diamond DSC manufactured by Perkin Elmer, Inc.), and after the sample was heated from 40° C. to 190° C. at 10° C./min in a nitrogen atmosphere, heat treatment was performed for 10 minutes at 190° C. Next, the sample was cooled to 40° C. at 10° C./min, and after the sample was held at 40° C. for 2 minutes, the sample was heated to 190° C. at a heating rate of 10° C./min. In the DSC curve (melting curve) obtained in the heating process, a linear baseline was set in the range of from 85 to 175° C., and the amount of heat was calculated from the area of the portion enclosed by this linear baseline and the DSC curve. This was converted to a value per sample mass.

9. Logarithmic Viscosity

A solution obtained by dissolving 0.5 g of heat-resistant resin in 100 mL of NMP was measured at 25° C. using an Ubbelohde viscometer.

10. Melting Point

A differential scanning calorimeter (Diamond DSC manufactured by Perkin Elmer, Inc.) was used, and the peak temperature of the melting peak observed when a 5 mg of the resin sample was heated at a heating rate of 20° C./min in a nitrogen gas atmosphere was determined as the melting point.

11. Glass Transition Temperature

A resin solution or a resin solution obtained by dissolving only a modified porous layer by immersing a battery separator in a good solvent was applied onto a PET film (E5001 manufactured by Toyobo Co., Ltd.) or a polypropylene film (Pyrene-OT (trade name) manufactured by Toyobo Co., Ltd.) using an applicator with an appropriate gap. A film obtained was peeled off after pre-drying at 120° C. for 10 minutes, then fixed in a metal frame having an appropriate size with a heat-resistant adhesive tape, and further dried in vacuum at 200° C. for 12 hours. The dried film was obtained. A sample having a width of 4 mm and a length of 21 mm was cut out from the dried film obtained, and the measurement was conducted using a dynamic viscoelasticity measuring apparatus (DVA-220; manufactured by IT Keisoku Seigyo Co. Ltd.) for the measurement length of 15 mm. The measurements were performed for the temperature from room temperature to 450° C., under the conditions of 110 Hz and a rate of temperature increase of 4° C./min. At the inflection point of storage modulus (E'), the glass transition temperature was defined as the intersection of the extrapolated line from the baseline below the glass transition temperature and the tangent at the maximum slope of the curve at the temperature equal to or greater than the inflection point.

12. Porosity

A 10 cm-square sample was prepared, and the sample volume ($cm^3$) and the mass (g) thereof were measured. The porosity (%) was calculated from the obtained results using the following formula.

$$\text{Porosity}=(1-\text{mass}/(\text{resin density}\times\text{sample volume}))\times 100$$

13. Scratch Resistance

Both edges of the rolled battery separator obtained from examples and comparative examples were subjected to slit process. The slit process was carried out by a slitter (Type WA177A, manufactured by Nishimura Seisakusho Corp.), under the condition of velocity of 20 m/min and tension of 50 N/100 mm. For the rolls which had contacts with the coated surface during the process, two hard chrome plated rolls (both were free rolls) were used. Then, while winding back the rolled battery separator after slit process, delaminated defects equal to or larger than 0.5 mm in major axes were counted under visual observation and observation using a magnifying glass of 10 times magnification with a scale (PEAK SCALE LUPE×10, manufactured by Tokai Sangyo Corp.). The results were evaluated according to the criteria below. The area of evaluation was 100 mm in width and 500 mm in length. (If the width was less than 100 mm, the evaluation length was adjusted so that the total evaluation area was same.)

Evaluation Criteria

Exceptionally Good: Not more than 10.

Good: From 11 to 30.

Fail: Not less than 31.

Example 1

A polyolefin composition A was obtained by addition of 0.375 parts by weight of tetrakis-[methylene-3-(3,5-di-tert-butyl-4-hydroxyphenyl) propionate] methane as an antioxidant to 100 parts by weight of a composition, which comprises 30 wt. % of ultrahigh molecular weight polyethylene (UHMWPE) with the weight average molecular weight of 2,000,000 and 70 wt. % of high-density polyethylene (HDPE) with the weight average molecular weight of 350,000. 30 parts by weight of the polyolefin composition A was introduced into a biaxial extruder. Through the side-feeder of the biaxial extruder, 70 parts by weight of liquid paraffin was supplied, and melt-kneaded to prepare a polyolefin resin solution A inside the extruder.

A polyethylene composition B was obtained by addition of 0.375 parts by weight of tetrakis-[methylene-3-(3,5-di-tert-butyl-4-hydroxyphenyl) propionate] methane as an antioxidant to 100 parts by weight of a composition comprising 15 wt. % of ultrahigh molecular weight polyethylene (UHMWPE) with a weight average molecular weight of 2,000,000, 65 wt. % of high-density polyethylene (HDPE) with a weight average molecular weight of 300,000, and 20 wt. % of a polypropylene having a weight average molecular weight of 530,000 and a heat of fusion of 96 J/g. 25 parts by weight of the polyolefin composition B was introduced into a biaxial extruder. Through the side-feeder of the biaxial extruder, 75 parts by weight of liquid paraffin was supplied, and melt-kneaded to prepare a polyethylene resin solution B inside the extruder.

The obtained polyolefin resin solutions A and B were coextruded from a laminated die with a layer configuration A/B/A and a solution ratio of 1/1/1 at 190° C. The extrudate was taken up on a cooling roll of 800 mm diameter, inner cooling water of which was kept at 25° C., to form a multi-layer gel-like product. During this operation, one polyester doctor blade was placed in contact with the cooling roll between the point where the multi-layer gel-like formed material departs from the cooling roll and the point where the polyolefin resin solution for lamination extruded from the die comes into contact with the cooling roll (region where there is no contact between the cooling roll and the multi-layer gel-like molded product or the polyolefin resin solution for lamination), parallel to the transverse direction of the gel-like product, and scraped off the liquid paraffin deposited on the cooling roll surface. That is, the parts corresponding to the long edge among the four outside edges of the doctor blade forming a roughly sheet-like shape was pressed in the width direction of the cooling roll against the portions of the outer peripheral part of the cylindrical cooling roll not in contact with the multi-layer gel-like molded product or the polyolefin resin solution for lamination. Subsequently, the multi-layer gel-like molded product was subjected to simultaneous biaxial stretching to 5×5 magnification at a temperature of 115° C. so as to obtain a stretched and molded material. The stretched and molded material obtained was washed with methylene chloride to extract and remove residual liquid paraffin, dried and a porous molded material was obtained. Next, the porous molded product was held on a tenter and subjected to heat treatment for 3 seconds at 125° C. to obtain a multi-layer polyolefin porous membrane having a thickness of 20 μm, a porosity of 43%, an average pore size of 0.14 μm, an air permeation resistance of 232 sec/100 cc Air, and a meltdown temperature of 178° C.

Synthesis of Heat-Resistant Resin

In a four-necked flask equipped with a thermometer, a condenser and a nitrogen gas introducing tube, 1 mol of a trimellitic anhydride (TMA), 0.8 mol of o-tolidine diisocyanate (TODI), 0.2 mol of 2,4-tolidine diisocyanate (TDI) and 0.01 mol of potassium fluoride were introduced together with N-methyl-2-pyrrolidone to make up the solid concentration of 14%, and the mixture was stirred at 100° C. for 5 hours. Then the mixture was diluted with N-methyl-2-pyrrolidone to the solid concentration of 14% and a polyamideimide resin solution was synthesized. The logarithmic viscosity of the polyamideimide resin obtained was 1.35 dL/g and the glass transition temperature thereof was 320° C.

The polyamideimide resin solution, alumina particles of the average size of 0.5 μm, and N-methyl-2-pyrrolidone were mixed in the weight ratio of 26:34:40, respectively, introduced into a polypropylene container with zirconia oxide beads (trade designation: Torayceram (registered trademark), manufactured by Toray Industries, size 0.5 mm), and dispersed for 6 hours using a paint-shaker (manufactured by Toyo Seiki Seisakusho). Then, the varnish was obtained by filtering through a filter with filtering limit of 5 μm.

The varnish was coated by blade coating on the side of the multi-layer polyolefin porous membrane, which had been in contact with the cooling roll, passed through the low-humidity zone at temperature of 25° C. and the absolute humidity of 1.8 g/m³ for 8 seconds, followed by passing through the high-humidity zone at temperature of 25° C. and the absolute humidity of 12 g/m³ for 5 seconds. The treated membrane was then immersed in an aqueous solution containing 5 wt. % N-methyl-2-pyrrolidone for 10 seconds. The treated membrane was further washed with pure water and was dried by passing through a hot-air drier at 70° C. to make the final thickness 5 μm thicker than that of the multi-layer polyolefin porous membrane. A battery separator was thereby obtained.

Example 2

A battery separator was obtained in the same manner as in Example 1 with the exception that two pieces of polyester doctor blades were disposed to contact with the cooling roll at the interval of 20 mm.

Example 3

A battery separator was obtained in the same manner as in Example 1 with the exception that three pieces of polyester doctor blades were disposed to contact with the cooling roll at an interval of 20 mm from each other.

Example 4

A battery separator was obtained in the same manner as Example 1 with the exception that the internal cooling water temperature of the cooling roll was kept at 35° C.

Example 5

A battery separator was obtained in the same manner as in Example 1 with the exception that a polyolefin resin solution B was obtained by using a composition prepared by adding 0.375 parts by weight of an antioxidant to 100 parts by weight of a composition comprising 5 wt. % of an ultrahigh molecular weight polyethylene (UHMWPE) having a weight average molecular weight of 2,000,000, 55 wt. % of a high-density polyethylene (HDPE) having a weight average molecular weight of 300,000, and 40 wt. % of a polypropylene having a weight average molecular weight of 530,000 and a heat of fusion of 96 J/g as a polyolefin resin composition B and supplying 70 parts by weight of liquid paraffin to 30 parts by weight of the polyolefin composition B.

Example 6

A battery separator was obtained in the same manner as in Example 1 with the exception that a composition prepared by adding 0.375 parts by weight of an antioxidant to 100 parts by weight of a composition comprising 20 wt. % of an ultrahigh molecular weight polyethylene (UHMWPE) having a weight average molecular weight of 2,000,000 and 80 wt. % of a high-density polyethylene (HDPE) having a weight average molecular weight of 300,000 was used as the polyolefin resin composition A.

Example 7

Polyolefin solutions A and B were obtained in the same manner as in Example 6. The obtained polyolefin solution A was extruded at 190° C. from a single-layer die to a thickness of 350 µm, and a gel-like molded product A was formed as the solution was taken up by a cooling roll with a diameter of 800 mm, the inner cooling water of which was kept at 25° C. During this operation, one polyester doctor blade was placed in contact with the cooling roll between the point the where the multi-layer gel-like formed material departs from the cooling roll and the point where the polyolefin resin solution for lamination extruded from the die comes into contact with the cooling roll (region where there is no contact between the cooling roll and the multi-layer gel-like molded product or the polyolefin resin solution for lamination) so that the width direction of the gel-like product is parallel to the lengthwise direction end of the doctor blade, and scraped off the liquid paraffin deposited on the cooling roll surface. Next, polyolefin solution B was extruded at 190° C. from a single-layer die to a thickness of 700 µm, and a gel-like molded product B was formed as the solution was taken up by a cooling roll with a diameter of 800 mm, the inner cooling water of which was kept at 25° C. A doctor blade was not used to cool the gel-like molded product B.

The obtained gel-like molded products A and B were laminated in the order of A/B/A so that the surface of the gel-like composition A in contact with the cooling roll was used as the surface layer, and the products were bonded under 0.05 MPa of pressure at 110° C. to obtain a multi-layer gel-like molded product. A battery separator was obtained in the same manner as Example 1 with the exception that a multi-layer gel-like molded product obtained in this way was used.

Example 8

A battery separator was obtained in the same manner as in Example 6 with the exception that polyolefin resin solution A was obtained by supplying 75 parts by weight of liquid paraffin to 25 parts by weight of polyolefin resin composition A and that polyolefin resin solution B was obtained by supplying 70 parts by weight of liquid paraffin to 30 parts by weight of polyolefin resin composition B.

Example 9

A battery separator was obtained in the same manner as Example 3, except that the extruding amounts of the polyolefin solutions A and B had been adjusted so that the thickness of the multi-layer polyolefin porous membrane was the thickness described in the Table.

Example 10

A battery separator was obtained in the same manner as in Example 1 with the exception that a composition comprising 2 wt. % of an ultrahigh molecular weight polyethylene (UHMWPE) having a weight average molecular weight of 2,000,000 and 98 wt. % of a high-density polyethylene (HDPE) having a weight average molecular weight of 300,000 was used as polyolefin resin composition A, that composition comprising 60 wt. % of a high molecular weight polyethylene (HDPE) having a weight average molecular weight of 300,000 and 40 wt. % of a polypropylene having a weight average molecular weight of 530,000 and a heat of fusion of 96 J/g was used as polyolefin resin composition B, and that the ratios of each of the polyolefin compositions and liquid paraffin were respectively set to 30 wt. % and 25 wt. %.

Example 11

Polyolefin resin solutions A and B were obtained in the same manner as in Example 1 with the exception that a composition comprising 30 wt. % of an ultrahigh molecular weight polyethylene (UHMWPE) having a weight average molecular weight of 2,000,000 and 70 wt. % of a high-density polyethylene (HDPE) having a weight average molecular weight of 300,000 was used as polyolefin resin composition A, that composition comprising 65 wt. % of a high molecular weight polyethylene (HDPE) having a weight average molecular weight of 300,000 and 20 wt. % of a polypropylene having a weight average molecular weight of 530,000 and a heat of fusion of 96 J/g was used as polyolefin resin composition B, and that the ratios of each of the polyolefin compositions and liquid paraffin were respectively set to 28.5 wt. % and 30 wt. %. A battery separator was obtained in the same manner as in Example 1 with the exception that the obtained polyolefin resin solutions A and B were extruded from a multilayer die with a layer structure of B/A/B and a solution ratio of 1/1/1.

Example 12

A battery separator was obtained in the same manner as in Example 1 with the exception that in polyolefin resin solution A, the content of polyolefin composition A was set to 35 parts by weight and the content of liquid paraffin was set to 65 parts by weight.

Comparative Example 1

A battery separator was obtained in the same manner as Example 1, except that only the polyolefin solution A was used and extruded from a monolayer die at 190° C. to form a monolayer gel-like product and the monolayer gel-like product obtained was used instead of the multi-layer gel-like product.

Comparative Example 2

A battery separator was obtained in the same manner as in Example 6 with the exception that a polypropylene having a weight average molecular weight of 490,000 and a heat of fusion of 70 J/g was used as the polypropylene used in polyolefin solution B.

Comparative Example 3

A battery separator was obtained in the same manner as in Example 8 with the exception that a composition comprising 8 wt. % of an ultrahigh molecular weight polyethylene (UHMWPE) having a weight average molecular weight of 2,000,000, 32 wt. % of a high-density polyethylene (HDPE) having a weight average molecular weight of 300,000, and 60 wt. % of a polypropylene having a weight average molecular weight of 530,000 and a heat of fusion of 96 J/g was used as polyolefin resin composition B.

Comparative Example 4

A battery separator was obtained in the same manner as Example 1 with the exception that the internal cooling water temperature of the cooling roll was kept at 0° C. and the doctor blade was not used.

Comparative Example 5

A battery separator was obtained in the same manner as Example 1 with the exception that the polyolefin resin solution was immersed in water and kept at 25° C. for 1 minute instead of the cooling polyethylene resin solution extruded from the die by the cooling roll.

Comparative Example 6

A battery separator was obtained in the same manner as Example 1 with the exception that the polyolefin resin solution extruded from the die was cooled with a cooling roll, that a doctor blade was not used to obtain a gel-like molded product, and that the liquid paraffin deposited on the cooling roll was not scraped off.

Comparative Example 7

A battery separator was obtained in the same manner as Example 1 with the exception that the internal cooling water temperature of the cooling roll was kept at 50° C.

The characteristics of the multi-layer polyolefin porous membranes and the battery separators obtained from the Examples 1 to 12 and Comparative Examples 1 to 7 are listed in Table 1.

TABLE 1

| | Layer A | | | Layer B | | | | | | Manufacturing Conditions | |
| | | | | | | PP | | | | | Scraping off the |
| | UHMWPE Amount Added (wt. %) | HDPE Amount Added (wt. %) | Resin Concentration (wt. %) | UHMWPE Amount Added (wt. %) | HDPE Amount Added (wt. %) | Heat of fusion ΔHm (J/g) | Amount Added (wt. %) | Resin Concentration (wt. %) | Layer Configuration | Lamination method | Cooling roll temperature (° C.) | forming solvent Number of Blades |
|---|---|---|---|---|---|---|---|---|---|---|---|---|
| Example 1 | 30 | 70 | 30 | 15 | 65 | 96 | 20 | 25 | A/B/A | Coextrusion method | 25 | 1 |
| Example 2 | 30 | 70 | 30 | 15 | 65 | 96 | 20 | 25 | A/B/A | Coextrusion method | 25 | 2 |
| Example 3 | 30 | 70 | 30 | 15 | 65 | 96 | 20 | 25 | A/B/A | Coextrusion method | 25 | 3 |
| Example 4 | 30 | 70 | 30 | 15 | 65 | 96 | 20 | 25 | A/B/A | Coextrusion method | 35 | 1 |
| Example 5 | 30 | 70 | 30 | 5 | 55 | 96 | 40 | 30 | A/B/A | Coextrusion method | 25 | 1 |
| Example 6 | 20 | 80 | 30 | 15 | 65 | 96 | 20 | 25 | A/B/A | Coextrusion method | 25 | 1 |
| Example 7 | 20 | 80 | 30 | 15 | 65 | 96 | 20 | 25 | A/B/A | Bonding method | 25 | 1 |
| Example 8 | 25 | 75 | 25 | 15 | 65 | 96 | 20 | 30 | A/B/A | Coextrusion method | 25 | 1 |
| Example 9 | 30 | 70 | 30 | 15 | 65 | 96 | 20 | 25 | A/B/A | Coextrusion method | 25 | 3 |
| Example 10 | 2 | 98 | 30 | 0 | 70 | 96 | 30 | 25 | A/B/A | Coextrusion method | 25 | 1 |
| Example 11 | 30 | 70 | 28.5 | 0 | 60 | 96 | 40 | 30 | B/A/B | Coextrusion method | 25 | 1 |
| Example 12 | 30 | 70 | 35 | 15 | 65 | 96 | 20 | 25 | A/B/A | Coextrusion method | 25 | 1 |
| Comparative Example 1 | 30 | 70 | 30 | — | — | — | — | — | A | — | 25 | 1 |
| Comparative Example 2 | 20 | 80 | 30 | 15 | 65 | 70 | 20 | 25 | A/B/A | Coextrusion method | 25 | 1 |
| Comparative Example 3 | 20 | 80 | 25 | 8 | 32 | 96 | 60 | 30 | A/B/A | Coextrusion method | 25 | 1 |
| Comparative Example 4 | 30 | 70 | 30 | 15 | 65 | 96 | 20 | 25 | A/B/A | Coextrusion method | 0 | 0 |

TABLE 1-continued

| | Layer A | | | Layer B | | | | | | | Manufacturing Conditions | |
| --- | --- | --- | --- | --- | --- | --- | --- | --- | --- | --- | --- | --- |
| | | | | | | PP | | | | | | Scraping off the |
| | UHMWPE Amount Added (wt. %) | HDPE Amount Added (wt. %) | Resin Concentration (wt. %) | UHMWPE Amount Added (wt. %) | HDPE Amount Added (wt. %) | Heat of fusion ΔHm (J/g) | Amount Added (wt. %) | Resin Concentration (wt. %) | Layer Configuration | Lamination method | Cooling roll temperature (° C.) | forming solvent Number of Blades |
| Comparative Example 5 | 30 | 70 | 30 | 15 | 65 | 96 | 20 | 25 | A/B/A | Coextrusion method | 25 (water bath) | — |
| Comparative Example 6 | 30 | 70 | 30 | 15 | 65 | 96 | 20 | 25 | A/B/A | Coextrusion method | 25 | 0 |
| Comparative Example 7 | 30 | 70 | 30 | 15 | 65 | 96 | 20 | 25 | A/B/A | Coextrusion method | 50 | 1 |

TABLE 2

| | Characteristics | | | | | | |
| --- | --- | --- | --- | --- | --- | --- | --- |
| | Thickness of multi-layer polyolefin porous membrane (μm) | Meltdown temperature (° C.) | Air permeation resistance of multi-layer polyolefin porous membrane (X) (sec/100 cc Air) | Number of Protrusions (protrusions/cm$^2$) | Average Protrusion Height (μm) | 0° Peel Strength (N/15 mm) | Scratch Resistance |
| Example 1 | 20 | 178 | 232 | 65 | 1.7 | 117 | Exceptionally Good |
| Example 2 | 20 | 178 | 231 | 68 | 1.7 | 118 | Exceptionally Good |
| Example 3 | 20 | 178 | 236 | 71 | 1.8 | 120 | Exceptionally Good |
| Example 4 | 20 | 178 | 236 | 66 | 1.8 | 119 | Exceptionally Good |
| Example 5 | 20 | 180 | 240 | 65 | 1.7 | 116 | Exceptionally Good |
| Example 6 | 20 | 175 | 232 | 44 | 2.3 | 123 | Exceptionally Good |
| Example 7 | 20 | 175 | 240 | 44 | 2.3 | 123 | Exceptionally Good |
| Example 8 | 20 | 175 | 272 | 50 | 1.7 | 116 | Exceptionally Good |
| Example 9 | 7 | 178 | 235 | 91 | 1.4 | 116 | Exceptionally Good |
| Example 10 | 20 | 178 | 281 | 7 | 3.4 | 124 | Exceptionally Good |
| Example 11 | 18 | 180 | 288 | 34 | 2.0 | 120 | Exceptionally Good |
| Example 12 | 20 | 174 | 280 | 47 | 1.7 | 114 | Exceptionally Good |
| Comparative Example 1 | 20 | 148 | 198 | 40 | 1.7 | 113 | Exceptionally Good |
| Comparative Example 2 | 20 | 159 | 272 | 44 | 2.3 | 123 | Exceptionally Good |
| Comparative Example 3 | 20 | 180 | 312 | 39 | 2.0 | 122 | Exceptionally Good |
| Comparative Example 4 | 20 | 180 | 244 | 0 | — | 91 | Fail |
| Comparative Example 5 | 20 | 180 | 241 | 2 | 0.4 | 96 | Good |
| Comparative Example 6 | 20 | 180 | 240 | 0 | — | 91 | Fail |
| Comparative Example 7 | 20 | 180 | 242 | 0 | — | 90 | Fail |

REFERENCE SIGNS LIST

1 Battery separator
2 Multi-layer polyolefin porous membrane
3 Modified porous layer
4 Double-sided adhesive tape
5 Aluminum plate
6 Crystal nucleus of polyolefin spherulite
7 Die
8 Polyolefin resin solution
9 Cooling roll
10 Doctor blade
11 Gel-like product

The invention claimed is:

1. A multi-layer polyolefin porous membrane, comprising:
    first and second layers; and
    a plurality of protrusions comprising polyolefin, wherein the protrusions have a protrusion width (W) satisfying 5 μm≤W≤50 μm and have a protrusion height (H) satisfying 0.5 μm≤H, wherein the protrusions are non-periodic and are randomly disposed on a first side of the membrane, and wherein the protrusions are disposed with a density of not less than 3 protrusions/cm$^2$ and not greater than 200 protrusions/cm$^2$, and wherein the protrusions are disposed at locations corresponding with spherulite nuclei, wherein a meltdown temperature of the membrane is not lower than 165° C., wherein an air permeation resistance of the membrane is not greater than 300 sec/100 cc Air, and wherein a thickness of the membrane is not greater than 20 μm.

2. The multi-layer polyolefin porous membrane according to claim 1, wherein at least one of the first and second layers contains a polypropylene having a heat of fusion of not less than 90 J/g.

3. A battery separator comprising a multi-layer polyolefin porous membrane, comprising:

first and second layers; and a plurality of protrusions comprising polyolefin, wherein the protrusions have a protrusion width (W) satisfying 5 μm≤W≤50 μm and have a protrusion height (H) satisfying 0.5 μm≤H, wherein the protrusions are non-periodic and are randomly disposed on a first side of the membrane, and wherein the protrusions are disposed with a density of not less than 3 protrusions/cm$^2$ and not greater than 200 protrusions/cm$^2$, and wherein the protrusions are disposed at locations corresponding with spherulite nuclei, wherein a meltdown temperature of the membrane is not lower than 165° C., wherein an air permeation resistance of the membrane is not greater than 300 sec/100 cc Air, and wherein a thickness of the membrane is not greater than 20 μm.

4. The separator according to claim 3, wherein at least one of the first and second layers of the membrane contains a polypropylene having a heat of fusion of not less than 90 J/g.

* * * * *